United States Patent
Lin et al.

(10) Patent No.: US 11,227,365 B2
(45) Date of Patent: Jan. 18, 2022

(54) IMAGE NOISE REDUCTION USING SPECTRAL TRANSFORMS

(71) Applicant: FLIR SYSTEMS, INC., Wilsonville, OR (US)

(72) Inventors: Stephanie Lin, Buellton, CA (US); Nicholas Högasten, Santa Barbara, CA (US)

(73) Assignee: FLIR Systems, Inc., Wilsonville, OR (US)

(*) Notice: Subject to any disclaimer, the term of this patent is extended or adjusted under 35 U.S.C. 154(b) by 65 days.

(21) Appl. No.: 16/689,897

(22) Filed: Nov. 20, 2019

(65) Prior Publication Data
US 2020/0090308 A1 Mar. 19, 2020

Related U.S. Application Data

(63) Continuation of application No. 16/503,342, filed on Jul. 3, 2019, now Pat. No. 11,113,791, which is a
(Continued)

(51) Int. Cl.
*G06T 5/00* (2006.01)
*G06T 3/20* (2006.01)
(Continued)

(52) U.S. Cl.
CPC .......... *G06T 5/002* (2013.01); *G06T 3/20* (2013.01); *G06T 7/37* (2017.01); *G06T 7/579* (2017.01);
(Continued)

(58) Field of Classification Search
CPC ... G06T 7/37; G06T 3/20; G06T 2207/20182; G06T 5/10; G06T 2207/10016;
(Continued)

(56) References Cited

U.S. PATENT DOCUMENTS 4,972,260 A 11/1990 Fujikawa et al.
5,157,732 A 10/1992 Ishii et al.
(Continued)

FOREIGN PATENT DOCUMENTS

CN 1917590 2/2007
EP 1594087 11/2005
(Continued)

OTHER PUBLICATIONS

Zhang, Zibang, Xiao Ma, and Jingang Zhong. "Single-pixel imaging by means of Fourier spectrum acquisition." Nature communications 6.1 (2015): 1-6. (Year: 2015).*
(Continued)

*Primary Examiner* — Pinalben Patel
(74) *Attorney, Agent, or Firm* — Haynes and Boone, LLP

(57) ABSTRACT

Various techniques are provided for reducing noise in captured image frames. In one example, a method includes determining row values for image frames comprising scene information and noise information. The method also includes performing first spectral transforms in a first domain on corresponding subsets of the row values to determine first spectral coefficients. The method also includes performing second spectral transforms in a second domain on corresponding subsets of the first spectral coefficients to determine second spectral coefficients. The method also includes selectively adjusting the second spectral coefficients. The method also includes determining row correction terms based on the adjusted second spectral coefficients to reduce the noise information of the image frames. Additional methods and systems are also provided.

18 Claims, 17 Drawing Sheets

Related U.S. Application Data continuation-in-part of application No. PCT/US2017/068596, filed on Dec. 27, 2017.

(60) Provisional application No. 62/785,672, filed on Dec. 27, 2018, provisional application No. 62/441,902, filed on Jan. 3, 2017.

(51) Int. Cl.
  *G06T 7/37* (2017.01)
  *G06T 7/579* (2017.01)

(52) U.S. Cl.
  CPC .............. *G06T 2207/10016* (2013.01); *G06T 2207/10048* (2013.01); *G06T 2207/20182* (2013.01)

(58) Field of Classification Search
  CPC ........... G06T 2207/20052; G06T 7/579; G06T 2207/20064; G06T 2207/20056; G06T 5/002; G06T 2207/10048
  See application file for complete search history.

(56) References Cited

U.S. PATENT DOCUMENTS

| | | | |
|---|---|---|---|
| 5,258,621 A | 11/1993 | Noble | |
| 5,526,446 A * | 6/1996 | Adelson | G06K 9/40 382/260 |
| 5,598,482 A | 1/1997 | Balasubramanian et al. | |
| 5,654,549 A | 8/1997 | Landecker et al. | |
| 5,721,427 A | 2/1998 | White et al. | |
| 5,729,631 A * | 3/1998 | Wober | G06T 5/10 382/232 |
| 5,881,182 A | 3/1999 | Fiete et al. | |
| 5,887,084 A | 3/1999 | Wober et al. | |
| 5,903,659 A | 5/1999 | Kilgore | |
| 5,943,170 A | 8/1999 | Inbar et al. | |
| 6,067,125 A | 5/2000 | May | |
| 6,122,314 A | 9/2000 | Bruls et al. | |
| 6,211,515 B1 | 4/2001 | Chen et al. | |
| 7,362,911 B1 | 4/2008 | Frank | |
| 7,566,942 B2 | 7/2009 | Viens et al. | |
| 7,805,020 B2 | 9/2010 | Trudeau et al. | |
| 8,189,050 B1 | 5/2012 | Hughes et al. | |
| 8,203,116 B2 | 6/2012 | Young | |
| 8,208,026 B2 | 6/2012 | Högasten et al. | |
| 8,306,275 B2 | 11/2012 | Högasten et al. | |
| 8,897,571 B1 * | 11/2014 | Robinson | G06K 9/0063 382/191 |
| 2002/0171737 A1 | 11/2002 | Tullis | |
| 2003/0093805 A1 | 5/2003 | Gin | |
| 2003/0123750 A1 | 7/2003 | Yu | |
| 2003/0146975 A1 | 8/2003 | Joung et al. | |
| 2003/0198400 A1 | 10/2003 | Alderson et al. | |
| 2004/0028286 A1 | 2/2004 | Saigusa et al. | |
| 2004/0179738 A1 | 9/2004 | Dai et al. | |
| 2004/0212703 A1 | 10/2004 | Sugimoto et al. | |
| 2005/0105627 A1 | 5/2005 | Sun et al. | |
| 2005/0107982 A1 | 5/2005 | Sun et al. | |
| 2005/0281458 A1 * | 12/2005 | Adams, Jr. | G06T 5/10 382/162 |
| 2006/0038826 A1 | 2/2006 | Daly | |
| 2006/0164699 A1 | 7/2006 | Inoue | |
| 2006/0262210 A1 | 11/2006 | Smith et al. | |
| 2006/0279632 A1 | 12/2006 | Anderson | |
| 2007/0216786 A1 | 9/2007 | Hung et al. | |
| 2007/0247611 A1 | 10/2007 | Tamaki et al. | |
| 2008/0025630 A1 | 1/2008 | Hofman et al. | |
| 2008/0094479 A1 | 4/2008 | Yost et al. | |
| 2008/0211916 A1 | 9/2008 | Ono | |
| 2008/0266413 A1 | 10/2008 | Cohen et al. | |
| 2008/0278607 A1 | 11/2008 | Zhang et al. | |
| 2009/0021611 A1 | 1/2009 | Utsugi | |
| 2009/0141124 A1 | 6/2009 | Liu et al. | |
| 2009/0257679 A1 | 10/2009 | Hogasten | |
| 2010/0045870 A1 | 2/2010 | Chao | |
| 2010/0165122 A1 | 7/2010 | Castorina et al. | |
| 2010/0220193 A1 | 9/2010 | Hogasten et al. | |
| 2011/0050969 A1 | 3/2011 | Nishihara | |
| 2011/0121178 A1 | 5/2011 | Strandemar | |
| 2012/0075506 A1 | 3/2012 | Van Beek | |
| 2012/0091340 A1 | 4/2012 | Young | |
| 2012/0099001 A1 | 4/2012 | Oyama | |
| 2012/0229650 A1 | 9/2012 | Matthews | |
| 2015/0254813 A1 * | 9/2015 | Foi | G06T 5/002 382/275 |

FOREIGN PATENT DOCUMENTS

| | | |
|---|---|---|
| EP | 2533226 | 12/2012 |
| JP | 2002344814 | 11/2002 |
| WO | WO 2001/035636 | 5/2001 |
| WO | WO 2002/067575 | 8/2002 |
| WO | WO 2008/094102 | 8/2008 |
| WO | WO 2011131758 | 10/2011 |
| WO | WO 2012027739 | 3/2012 |
| WO | WO 2012/170949 | 12/2012 |
| WO | WO 2012/170953 | 12/2012 |
| WO | WO 2012170946 | 12/2012 |

OTHER PUBLICATIONS

FLIR, "FLIR P640 Infrared Camera", Jan. 23, 2010, pp. 1-2 http://www.flir.com/uploadedFiles/Thermography_APAC/Products/Product_Literature/AU_P640_Datasheet_APAD.pdf.

Neto et al., "Figures of merit and optimization of a $VO_2$ microbolometer with strong electrothermal feedback", SPIE, Jul. 1, 2008, pp. 1-15, vol. 47, No. 7, Bellingham, WA.

Tzimopoulou et al., "Scene based techniques for nonuniformity correction of infrared focal plane arrays", Proceedings of SPIE, Jul. 19, 1998, pp. 172-183, vol. 3436, International Society for Optical Engineering, US.

Perry, Greg, "Counters and Accumulators, Absolute Beginner's Guide to Programming" [online], Apr. 2001, [Retrieved on May 19, 2014]. Retrieved from the Internet: <URL: www.safaribooksonline.com>.

Foi et al., "Image denoising by sparse 3D transform-domain collaborative filtering", Aug. 2007, IEEE Transactions on image processing, vol. 16, No. 8.

Yang, Jie Xiang, "Adaptive Filtering Techniques for Acquisition Noise and Coding Artifacts or Digital Pictures", Aug. 2010, RMIT University, pp. 1-160.

Maggioni et al., "Video denoising using separable 4-D nonlocal spatiotemporal transforms", Image Processing: Algorithms and Systems, Feb. 10, 2011, pp. 1-11, vol. 7870, No. 1, Bellingham, WA.

Romanenko et al. "Block matching noise reduction method for photographic images, applied in Bayer RAW domain, optimized for real-time implementation", Proceedings of Spie, Apr. 26, 2012, pp. 1-14, vol. 8437.

Maggioni Matteo et al., "Joint Removal of Random and Fixed-Pattern Noise Through Spatiotemporal Video Filtering", IEEE Transactions on Image Processing, Oct. 1, 2014, pp. 4282-4296, vol. 23, No. 10, Piscataway, NJ.

Zhenwang Liu et al., "A Fixed-Pattern Noise Correction Method Based on Gray Value Compensation for TDI CMOS Image Sensor", Sep. 16, 2015, pp. 23496-23513, vol. 15, No. 9.

* cited by examiner

IMAGE NOISE REDUCTION USING SPECTRAL TRANSFORMS

CROSS-REFERENCE TO RELATED APPLICATIONS

This application is a continuation of U.S. patent application Ser. No. 16/503,342 filed Jul. 3, 2019 and entitled "IMAGE NOISE REDUCTION USING SPECTRAL TRANSFORMS," which is hereby incorporated by reference in its entirety.

U.S. patent application Ser. No. 16/503,342 filed Jul. 3, 2019 is a continuation-in-part of International Patent Application No. PCT/US2017/068596 filed Dec. 27, 2017 and entitled "IMAGE NOISE REDUCTION USING SPECTRAL TRANSFORMS," which is incorporated herein by reference in its entirety.

International Patent Application No. PCT/US2017/068596 filed Dec. 27, 2017 claims the benefit of and priority to U.S. Patent Application No. 62/441,902 filed Jan. 3, 2017 and entitled "IMAGE NOISE REDUCTION USING SPECTRAL TRANSFORMS," which is hereby incorporated by reference in its entirety.

U.S. patent application Ser. No. 16/503,342 filed Jul. 3, 2019 claims the benefit of and priority to U.S. Patent Application No. 62/785,672 filed Dec. 27, 2018 and entitled "IMAGE NOISE REDUCTION USING SPECTRAL TRANSFORMS," which is hereby incorporated by reference in its entirety.

This application claims the benefit of and priority to U.S. Patent Application No. 62/785,672 filed Dec. 27, 2018 and entitled "IMAGE NOISE REDUCTION USING SPECTRAL TRANSFORMS," which is hereby incorporated by reference in its entirety.

TECHNICAL FIELD

The present invention relates generally to imaging and, more particularly, to image noise filtering techniques.

BACKGROUND

In the field of image capture and processing, row and column noise is a recurring problem. In this regard, various components of imaging systems may produce some amount of noise that becomes unintentionally added to captured images. For example, certain circuit components (e.g., row or column amplifiers) may be used during the capture and readout of all pixel data associated with a given column or row. Manufacturing variations or calibration errors associated with such components can therefore affect all pixel data that is captured and read out. This can result in rows or columns of the captured images exhibiting offsets that manifest as horizontal or vertical lines. When this noise varies over time (e.g., temporal noise caused by fluctuations in temperature or other factors), it can result in flickering rows or columns.

Such noise is generally easily perceived by human observers and can therefore significantly degrade a user's experience when the images viewed in video form. However, this noise is often very difficult for machine-based processes to detect and remove in a reliable and computationally efficient manner, as such noise often affects a relatively large portion of an image (e.g., a large spatial area corresponding to an entire row or column). In this regard, it is often difficult for conventional noise reduction processes to effectively discriminate between scene-based information and temporally changing noise.

Moreover, existing noise reduction approaches often require processing of individual pixels or neighborhoods of pixels to identify noise. Unfortunately, such approaches can be extremely computationally intensive and may require realtime processing of thousands or even millions of individual pixel values. As a result, such conventional approaches are usually unsuitable for use in embedded systems where available computational power and memory may be insufficient for such processing.

SUMMARY

Improved techniques for image noise reduction are provided using spectral transforms.

By applying spectral transforms to row and column values associated with captured image frames, basis function components associated with noise may be selectively reduced to provide adjusted row and column values. The adjusted row and column values may be used to generate row and column offset terms to effectively filter out the noise from the captured images in an efficient and effective manner.

In one embodiment, a method includes determining row values for image frames comprising scene information and noise information; performing first spectral transforms in a first domain on corresponding subsets of the row values to determine first spectral coefficients; performing second spectral transforms in a second domain on corresponding subsets of the first spectral coefficients to determine second spectral coefficients; selectively adjusting the second spectral coefficients; and determining row correction terms based on the adjusted second spectral coefficients to reduce the noise information of the image frames.

In another embodiment, a system includes a memory component storing machine-executable instructions; and a processor configured to execute the instructions to cause the system to: determine row values for image frames comprising scene information and noise information, perform first spectral transforms in a first domain on corresponding subsets of the row values to determine first spectral coefficients, perform second spectral transforms in a second domain on corresponding subsets of the first spectral coefficients to determine second spectral coefficients, selectively adjust the second spectral coefficients, and determine row correction terms based on the adjusted second spectral coefficients to reduce the noise information of the image frames.

In another embodiment, a method includes determining a plurality of column mean values for an image frame comprising scene information and noise information; performing a spectral transform on at least a subset of the column mean values to determine spectral coefficients; adjusting the spectral coefficients to reduce the scene information; performing a reverse spectral transform on the adjusted spectral coefficients to determine adjusted column mean values; and generating column correction terms to reduce the noise information using the adjusted column mean values.

In another embodiment, a system includes a memory component storing machine-executable instructions; and a processor configured to execute the instructions to cause the system to: determine a plurality of column mean values for an image frame comprising scene information and noise information, perform a spectral transform on at least a subset of the column mean values to determine spectral coefficients, perform an adjustment of the spectral coefficients to reduce the scene information, perform a reverse spectral transform on the adjusted spectral coefficients to determine adjusted column mean values, and generate column correction terms to reduce the noise information using the adjusted column mean values.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Various techniques are provided to remove spatially correlated temporal row and column noise from image frames. In some embodiments, multiple image frames are captured and corresponding row and column values are determined for each image frame. In various embodiments, the row and column values may be implemented as mean row and column pixel values and/or sums of row and column pixel values, and collectively referred to as row and column vectors.

First spectral transforms are applied to subsets of the row and column values of each image frame to determine first spectral coefficients. Second spectral transforms are applied to the first set of spectral coefficients to determine second spectral coefficients. The magnitude of the second spectral coefficients is compared with magnitudes of a corresponding set of noise spectral coefficients calculated from other image frames having no scene information (e.g., only noise). Based on these comparisons, the second spectral coefficients are selectively adjusted to effectively attenuate temporal noise associated with the captured image frames.

Reverse second spectral transforms are performed on the adjusted second spectral coefficients to provide adjusted first spectral coefficients. Reverse first spectral transforms are performed on the adjusted first spectral coefficients to provide adjusted row and column values for the captured image frames. In some embodiments, multiple overlapping subsets of the adjusted row and column values may be averaged, weighted, and/or otherwise combined to determine final row and column values.

The adjusted and/or final row and column values are used to determine row and column correction terms (e.g., offsets to effectively filter out noise) that are applied to row and column pixel values of the captured image frames and thus reduce spatially correlated temporal row and column noise. By applying these techniques to the image frames of a video, row and column flickering and/or other noise may be effectively filtered and reduced. Such an approach contrasts with conventional noise filtering techniques that are often image-based and require the processing of thousands or even millions of pixel values.

Figure 1:
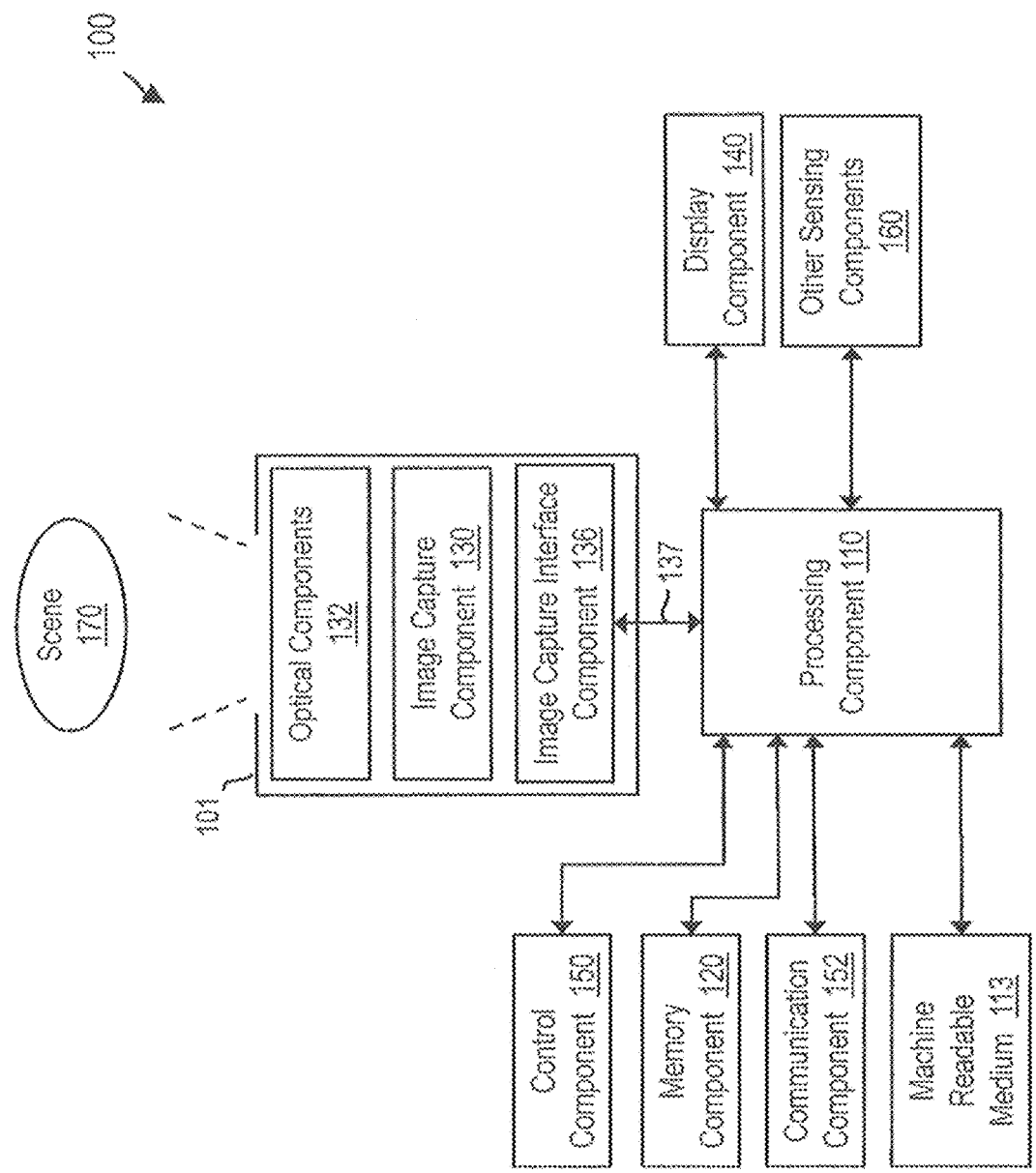
FIG. 1 illustrates a block diagram of an imaging system in accordance with an embodiment of the disclosure.

Turning now to the drawings, FIG. 1 illustrates a block diagram of an imaging system 100 in accordance with an embodiment of the disclosure. Imaging system 100 may be used to capture and process images (e.g., image frames) in accordance with techniques described herein. In some embodiments, various components of imaging system 100 may be provided in a camera component 101, such as an imaging camera. In other embodiments, one or more components of imaging system 100 may be implemented remotely from each other in a distributed fashion (e.g., networked or otherwise).

In some embodiments, imaging system 100 may be used to detect one or more gases of interest within a scene 170. For example, imaging system 100 may be configured to capture one or more images of scene 170 using camera component 101 (e.g., a thermal imaging camera) in response to infrared radiation 171 received from scene 170. Infrared radiation 171 may correspond to wavelengths that are emitted and/or absorbed by a gas 172 within scene 170, and other wavelengths that are emitted and/or absorbed by a background portion 173 of scene 170.

Captured images may be received by a processing component 110 and stored in a memory component 120. Processing component 110 may be configured to process the captured images in accordance with gas detection techniques discussed herein.

In some embodiments, imaging system 100 includes processing component 110, a machine readable medium 113, a memory component 120, image capture component 130, filters 131 (e.g., implemented by at least two sets of alternating filters 131A and 131B further discussed herein), optical components 132 (e.g., one or more lenses configured to receive infrared radiation 171 through an aperture 134 in camera component 101), an image capture interface component 136, a display component 140, a control component 150, a communication component 152, and other sensing components 160.

In some embodiments, imaging system 100 may be implemented as an imaging camera, such as camera component 101, to capture images, for example, of scene 170 (e.g., a field of view). In some embodiments, camera component 101 may include image capture component 130, optical components 132, and image capture interface component 136 housed in a protective enclosure. Imaging system 100 may represent any type of camera system which, for example, detects electromagnetic radiation (e.g., infrared radiation 171) and provides representative data (e.g., one or more still images or video images). For example, imaging system 100 may represent a camera component 101 that is directed to detect infrared radiation and/or visible light and provide associated image data.

In some embodiments, imaging system 100 may include a portable device and may be implemented, for example, coupled to various types of vehicles (e.g., an automobile, a truck, or other land-based vehicles). Imaging system 100 may be implemented with camera component 101 at various types of fixed scenes (e.g., automobile roadway, train railway, or other scenes) via one or more types of structural mounts. In some embodiments, camera component 101 may be mounted in a stationary arrangement to capture repetitive thermal images of scene 170.

In some embodiments, processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combinations of processing device and/or memory to execute instructions to perform any of the various operations described herein. Processing component 110 is configured to interface and communicate with the various components illustrated in FIG. 1 to perform method and processing steps as described herein. In various embodiments, it should be appreciated that processing operations and/or instructions may be integrated in software and/or hardware as part of processing component 110, or code (e.g., software or configuration data) which may be stored in memory component 120. Embodiments of processing operations and/or instructions disclosed herein may be stored by machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored instructions provided to imaging system 100 by coupling the machine readable medium 113 to imaging system 100 and/or by imaging system 100 downloading (e.g., via a wired or wireless link) the instructions from the machine readable medium (e.g., containing the non-transitory information). In various embodiments, as described herein, instructions provide for real time applications of processing various images of scene 170.

In some embodiments, memory component 120 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processing component 110 is configured to execute software stored in memory component 120 and/or machine readable medium 113 to perform various methods, processes, and operations in a manner as described herein.

In some embodiments, image capture component 130 may include an array of sensors (e.g., any type visible light, infrared, or other type of detector) for capturing images of scene 170. In one embodiment, the sensors of image capture component 130 provide for representing (e.g., converting) a captured images of scene 170 as digital data (e.g., via an analog-to-digital converter included as part of the sensor or separate from the sensor as part of imaging system 100). As further discussed herein, image capture component 130 may be implemented as an array of infrared sensors having at least two different types of filters distributed among the various sensors of the array.

In some embodiments, processing component 110 may be configured to receive images from image capture component 130, process the images, store the original and/or processed images in memory component 120, and/or retrieve stored images from memory component 120. In various aspects, processing component 110 may be remotely positioned, and processing component 110 may be configured to remotely receive images from image capture component 130 via wired or wireless communication with image capture interface component 136, as described herein. Processing component 110 may be configured to process images stored in memory component 120 to provide images (e.g., captured and/or processed images) to display component 140 for viewing by a user.

In some embodiments, display component 140 may include an image display device (e.g., a liquid crystal display (LCD)) or various other types of generally known video displays or monitors. Processing component 110 may be configured to display image data and information on display component 140. Processing component 110 may be configured to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

In some embodiments, control component 150 may include a user input and/or interface device having one or more user actuated components, such as one or more push buttons, slide bars, rotatable knobs or a keyboard, that are configured to generate one or more user actuated input control signals. Control component 150 may be configured to be integrated as part of display component 140 to operate as both a user input device and a display device, such as, for example, a touch screen device configured to receive input signals from a user touching different parts of the display screen. Processing component 110 may be configured to sense control input signals from control component 150 and respond to any sensed control input signals received therefrom.

In some embodiments, control component 150 may include a control panel unit (e.g., a wired or wireless handheld control unit) having one or more user-activated mechanisms (e.g., buttons, knobs, sliders, or others) configured to interface with a user and receive user input control signals. In various embodiments, it should be appreciated that the control panel unit may be configured to include one or more other user-activated mechanisms to provide various other control operations of imaging system 100, such as auto-focus, menu enable and selection, field of view (FoV), brightness, contrast, gain, offset, spatial, temporal, and/or various other features and/or parameters.

In some embodiments, control component 150 may include a graphical user interface (GUI), which may be integrated as part of display component 140 (e.g., a user actuated touch screen), having one or more images of the user-activated mechanisms (e.g., buttons, knobs, sliders, or others), which are configured to interface with a user and receive user input control signals via the display component 140. As an example for one or more embodiments as discussed further herein, display component 140 and control component 150 may represent appropriate portions of a tablet, a laptop computer, a desktop computer, or other type of device.

In some embodiments, processing component 110 may be configured to communicate with image capture interface component 136 (e.g., by receiving data and information from image capture component 130). Image capture interface component 136 may be configured to receive images from image capture component 130 and communicate the images to processing component 110 directly or through one or more wired or wireless communication components (e.g., represented by connection 137) in the manner of communication component 152 further described herein. Camera component 101 and processing component 110 may be positioned proximate to or remote from each other in various embodiments.

In some embodiments, imaging system 100 may include one or more other types of sensing components 160, including environmental and/or operational sensors, depending on the sensed application or implementation, which provide information to processing component 110 (e.g., by receiving sensor information from each sensing component 160). In various embodiments, other sensing components 160 may be configured to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 160 may include devices that relay information to processing component 110 via wireless communication. For example, each sensing component 160 may be configured to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In some embodiments, communication component 152 may be implemented as a network interface component (NIC) configured for communication with a network including other devices in the network. In various embodiments, communication component 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication component 152 may include an antenna coupled thereto for wireless communication purposes. In other embodiments, the communication component 152 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Figure 2:
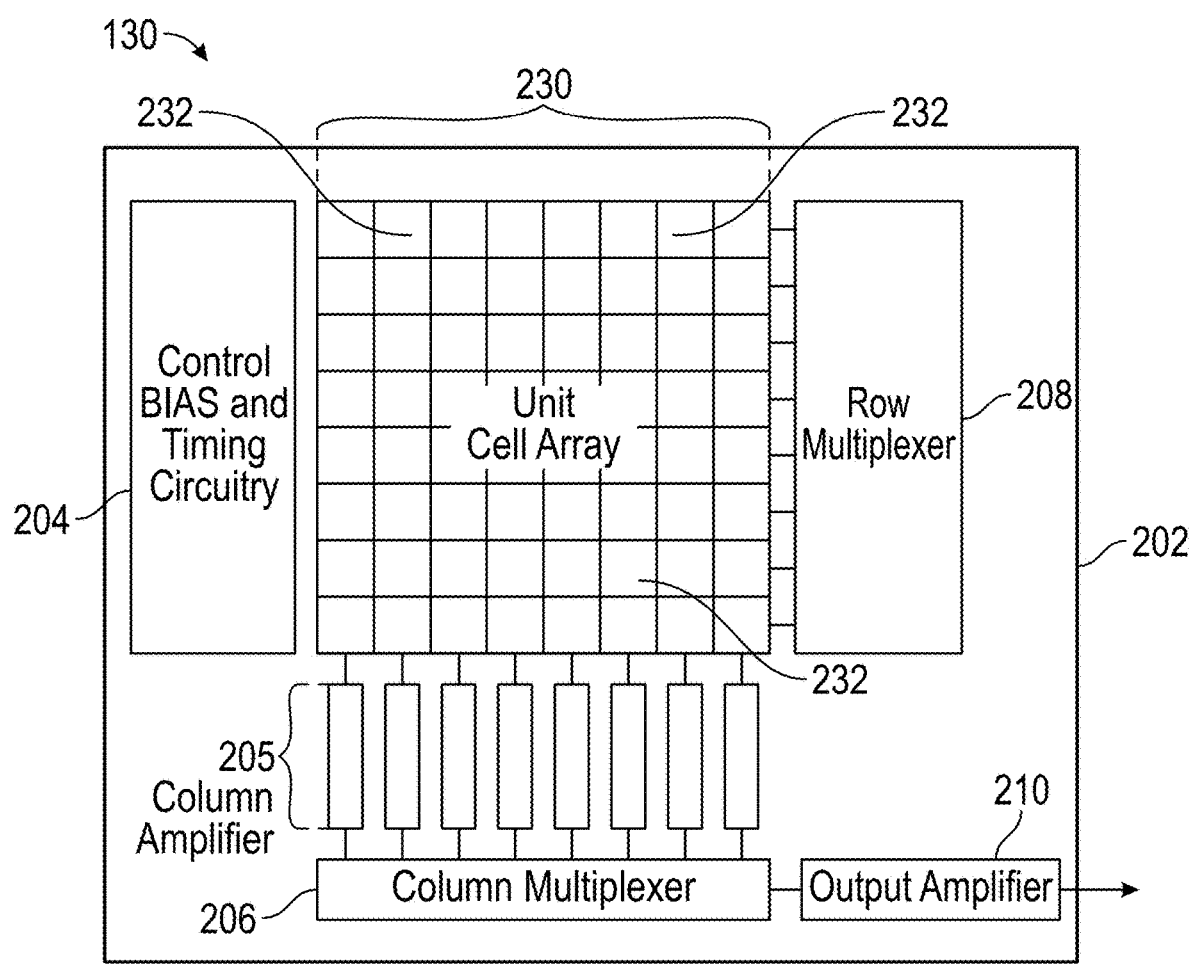
FIG. 2 illustrates a block diagram of an image capture component in accordance with an embodiment of the disclosure.

FIG. 2 illustrates a block diagram of image capture component 130 in accordance with an embodiment of the disclosure. In this illustrated embodiment, image capture component 130 is a focal plane array (FPA) including a sensor array 230 of infrared sensors 232 (e.g., implemented as unit cells) and a read out integrated circuit (ROIC) 202. Although an 8 by 8 array of infrared sensors 232 is shown, this is merely for purposes of example and ease of illustration. Any desired sensor array size may be used as desired.

Each infrared sensor 232 may be implemented, for example, by an infrared detector such as a microbolometer and associated circuitry to provide image data (e.g., a data value associated with a captured voltage) for a pixel of a captured thermal image. In this regard, time-multiplexed electrical signals may be provided by the infrared sensors 232 to ROIC 202. As further discussed herein, infrared sensors 232 may be associated with corresponding filters to permit at least two differently filtered images to be captured.

ROIC 202 includes bias generation and timing control circuitry 204, column amplifiers 205, a column multiplexer 206, a row multiplexer 208, and an output amplifier 210. Images captured by infrared sensors 232 may be provided by output amplifier 210 to processing component 110 and/or any other appropriate components to perform various processing techniques described herein. Further descriptions of ROICs and infrared sensors (e.g., microbolometer circuits) may be found in U.S. Pat. No. 6,028,309 issued Feb. 22, 2000, which is incorporated herein by reference in its entirety.

As discussed, various techniques are provided to remove spatially correlated temporal row and column noise from image frames. Although the techniques provided herein are discussed primarily in relation to rows, this is only for purposes of clarity and ease of understanding by the reader. It will be appreciated that the terms rows and columns are used herein interchangeably. In this regard, the rows of an image frame as discussed herein may be viewed as columns, and vice versa. Moreover, although various techniques are discussed primarily in relation to row mean values and column mean values (e.g., averaged values), other types of row and column values such as row sum values and column sum values (e.g., total values) may be used instead where appropriate.

For multiple image frames captured of scene 170, row and column noise may be represented by frame-to-frame offsets in the mean pixel values of each row or column. In this regard, for a given image frame, a row mean value may be determined by summing all pixel values of a row and dividing the sum by the number of pixels in the row. Column mean values may be determined in a similar manner. Row and column mean values may also be calculated for corresponding rows and columns of other (e.g., previously captured) image frames.

If the scene being imaged is completely static (e.g., assuming there is no movement in the scene and the imaging device remains fixed relative to the scene), then temporal row noise may be effectively eliminated by forcing the row mean values to be identical for each captured image frame. For example, if the image frames include rows of 640 pixels, and one of the row mean values determined for a newly captured image frame exhibits a value 1280 counts larger than a previously captured image frame, then it will be understood that the temporal row noise associated with the newly captured image frame is +2 counts (e.g., 1280 count increase over 640 pixel values). Thus, a row offset of −2 may be used to reduce the row noise. Similar techniques may be applied for column mean values to reduce column noise. Similar techniques may be applied to columns However, for non-static scenes, row and column mean values for given rows and columns in successive image frames may increase or decrease as a result of real changes in the imaged scene (e.g., actual scene content—not just noise). Therefore, it is also important that valid scene changes are not inadvertently filtered out as noise. The techniques disclosed herein may be used to discriminate between actual scene content and noise by selectively adjusting row and column offset values based on temporal noise determined through one or more spectral transforms.

Applying spectral transforms to row and column mean values has various advantages over conventional image noise reduction techniques. In this regard, when row and column mean values are viewed in the spatial domain (e.g., in a particular image) or in the temporal domain (e.g., varying from image to image), it can be difficult to ascertain the extent to which the variations are associated with noise or actual scene information. In accordance with various embodiments discussed herein, applying spectral transforms to row and column mean values can help distinguish noise from actual scene information.

For example, by performing first spectral transforms on row or column mean values of an image (e.g., first spectral transforms applied to a spatial domain), periodic signal content will be represented by first spectral coefficients. Depending on the nature of the periodic signal and the transforms (e.g. Discrete Cosine Transforms (DCT)) for the first spectral transforms, only a few spectral coefficients will have non-zero values. However, noise is generally not periodic (e.g., it is more random in nature) and spectral decomposition will, in general, result in all or most terms having non-zero values of low amplitude (relative to signal from actual scene content).

However, even if the first spectral transform coefficients associated with noise have similar magnitudes to those associated with scene information, second spectral transforms may be performed on the first spectral coefficients to further differentiate noise from scene information. In this regard, actual scene information will typically change differently over time (e.g., frame-to-frame) than changes associated with noise.

For example, noise is typically not tightly temporally correlated. As such, a periodic change or a gradual increase or decrease in row mean values (or first spectral coefficients calculated therefrom) over time is unlikely to be noise. In this regard, a first spectral coefficient with a magnitude lower than that associated with typical noise may not actually be noise if the first spectral coefficient exhibits only small changes frame-to-frame (e.g., in contrast to other first spectral coefficients associated with noise that may exhibit much more rapid frame-to-frame variations).

By applying second spectral transforms to the first spectral coefficients (e.g., second spectral transforms applied to a temporal domain), temporal (e.g., frame-to-frame) changes in the basis function components of the first spectral coefficients can be represented by the resulting second spectral coefficients. The resulting second spectral coefficients calculated from scene-based images can be compared to other coefficients calculated from pure noise-based images.

In this case, small and rapid frame-to-frame variations that are possibly also present and added to the gradual increase of a particular row or column mean value, would affect the second spectral coefficients associated with high temporal frequencies. By attenuating the second spectral coefficients that exhibit magnitudes similar to those determined from pure noise-based images, spatially correlated temporal noise may be reduced.

In various embodiments, techniques provided herein may be performed in a computationally efficient manner that operates on mean row and column values of image frames, rather than individual pixel values of the image frame as is more commonly performed in conventional image processing. For example, when applied to multiple image frames (e.g., 8 frames) having 512 rows and 640 columns each, the presently disclosed processing techniques may operate on a limited set of 512×8 row mean values and a limited set of 640×8 column mean values collectively corresponding to less than 10,000 discrete mean values (e.g., 512×8+640×8=9,216). In contrast, a conventional individual pixel-based processing approach for the same set of image frames would typically require processing of over two million discrete pixel values (e.g., 512×640×8=2,621,440). Thus, the mean value processing approach discussed herein requires significantly less memory than conventional pixel-based approaches (e.g., a reduction of over 99.4% in the number of stored values and corresponding to over 284 times fewer memory values).

Figure 3:
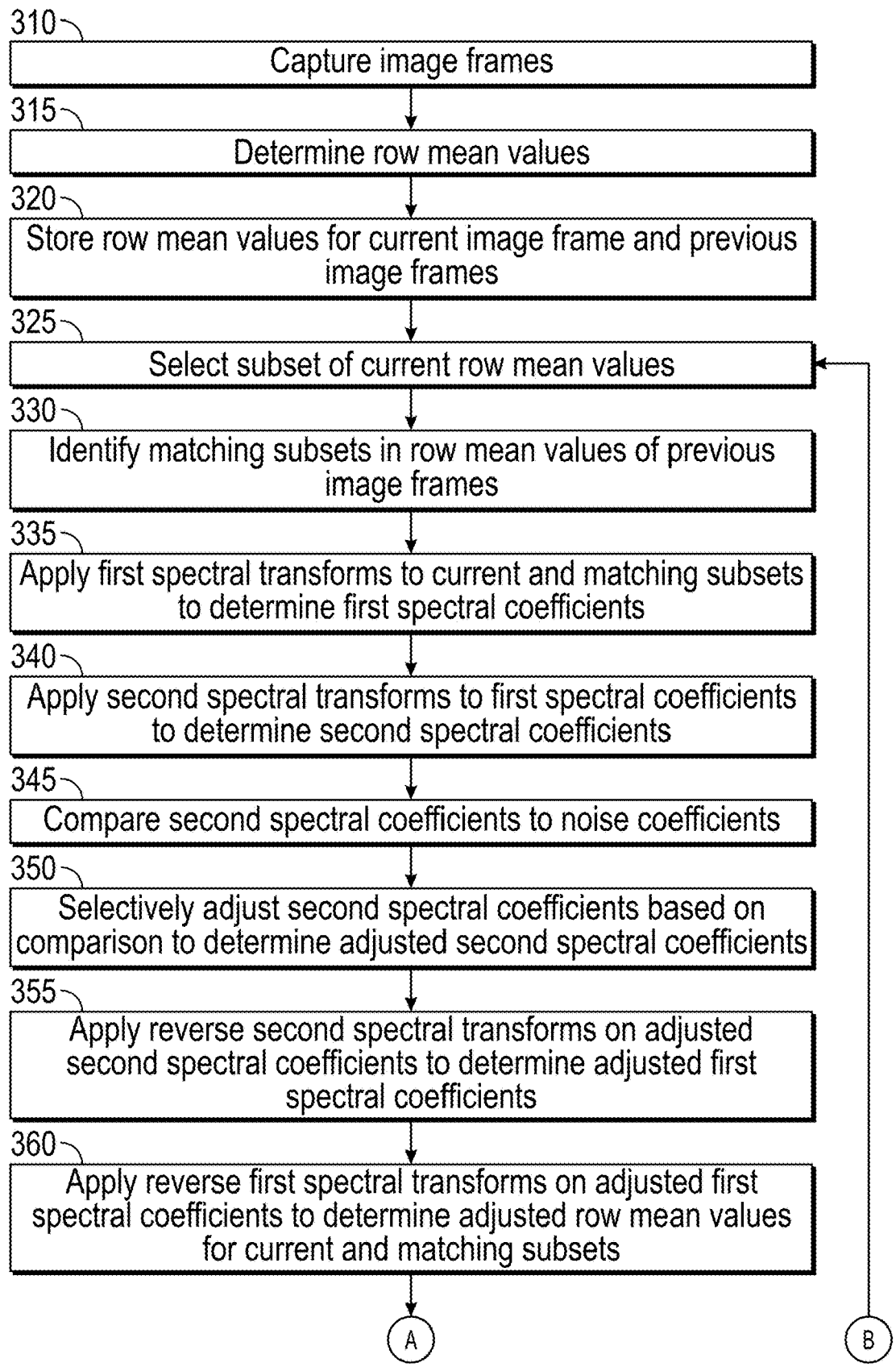
FIG. 3 illustrates a process of reducing row and column noise in accordance with an embodiment of the disclosure.
Figure 3:
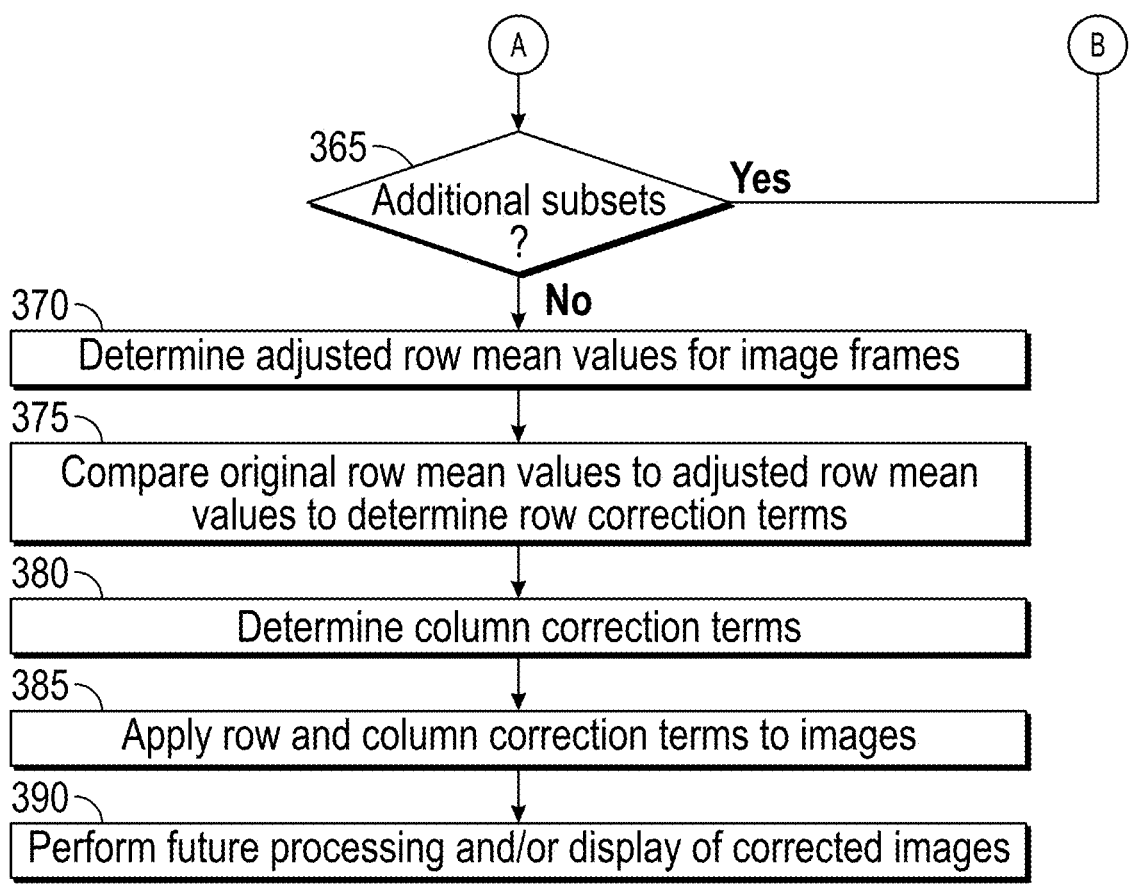
Figure 4:
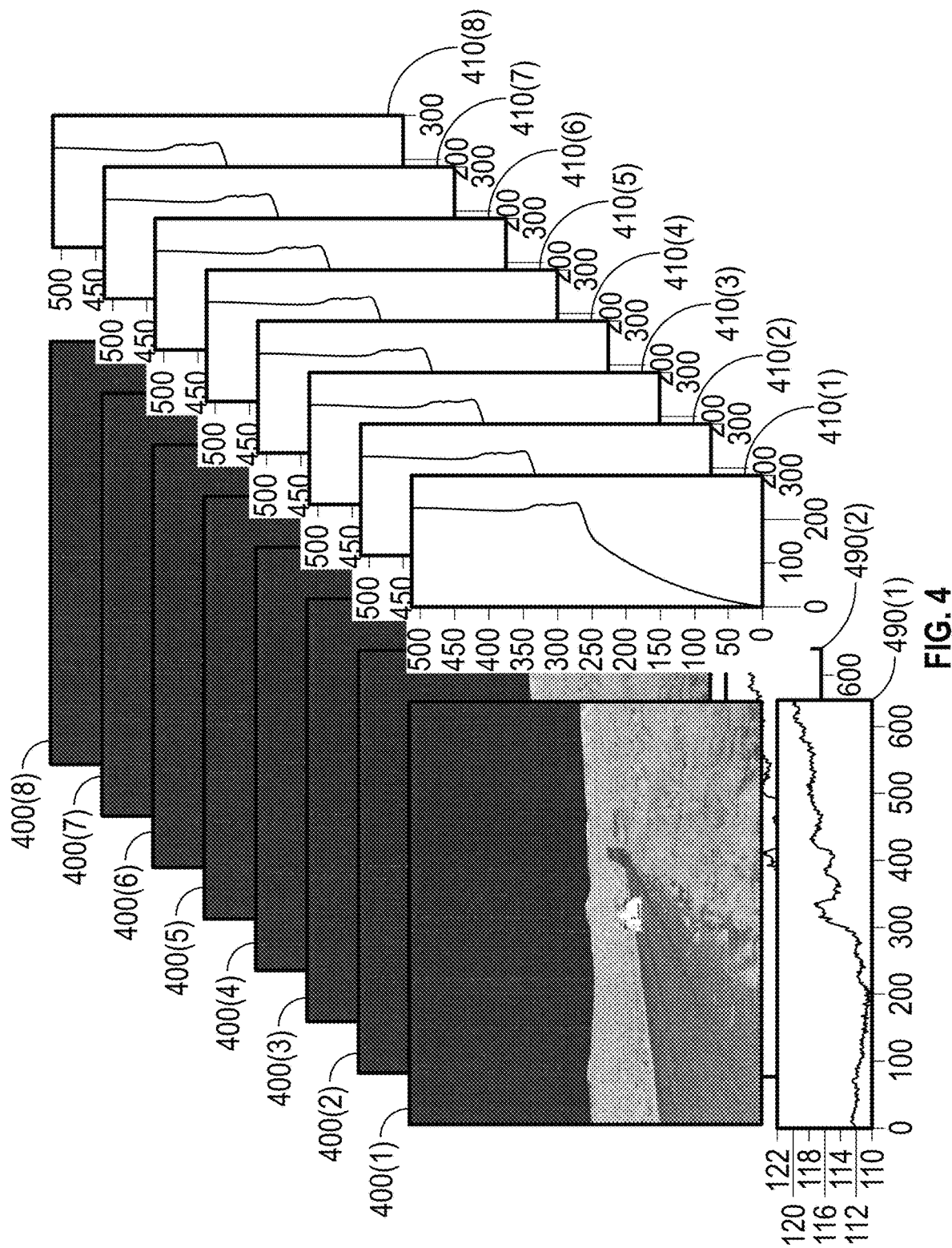
FIG. 4 illustrates a set of captured image frames with associated row mean values and associated column mean values in accordance with an embodiment of the disclosure.

FIG. 3 illustrates a process of reducing row and column noise that may be performed by system 100 in accordance with an embodiment of the disclosure. In block 310, image capture component 130 begins capturing image frames of scene 170 that are provided to processing component 110 through interface component 136 and connection 137. FIG. 4 illustrates a set of eight sequential image frames 400(1)-(8)

captured during block 310, with image frame 400(1) being the most recently captured, in accordance with an embodiment of the disclosure.

In this example, image frames 400(1)-(8) are thermal image frames with pixels arranged in 512 rows and 640 columns, however other image frame types (e.g., visible light images), image frame sizes, and numbers of image frames are also contemplated. In various embodiments, any desired number of image frames may be used, for example, at the cost of increased latency in the resulting processed image frames.

In block 315, processing component 110 determines row mean values 410(1)-(8) associated with captured image frames 400(1)-(8). In some embodiments, the row mean values 410 for a given image frame may be a set of the mean pixel values for all rows of the image frame. In this regard, the pixel values of each row may be averaged to, determine a mean value for each row. Thus, for an image frame having 512 rows, 512 row mean values are calculated. In some embodiments, the row mean values are the average of all pixels in a given row. In other embodiments, the row mean values may be based on only a portion of the pixels of a given row (e.g., pixels selected at desired intervals).

In FIG. 4, sets of row mean values 410(1)-(8) (e.g., also referred to as row vectors) are illustrated to the right of image frames 400(1)-(8). Also in FIG. 4, sets of column mean values 490(1)-(2) (e.g., also referred to as column vectors) are illustrated below image frames 400(1)-(2) which may be used in the processing performed in block 380 further discussed herein (e.g., for purposes of clarity, column mean values 490(3)-(8) for image frames 400(3)-(8) are not shown in FIG. 4).

Figure 5:
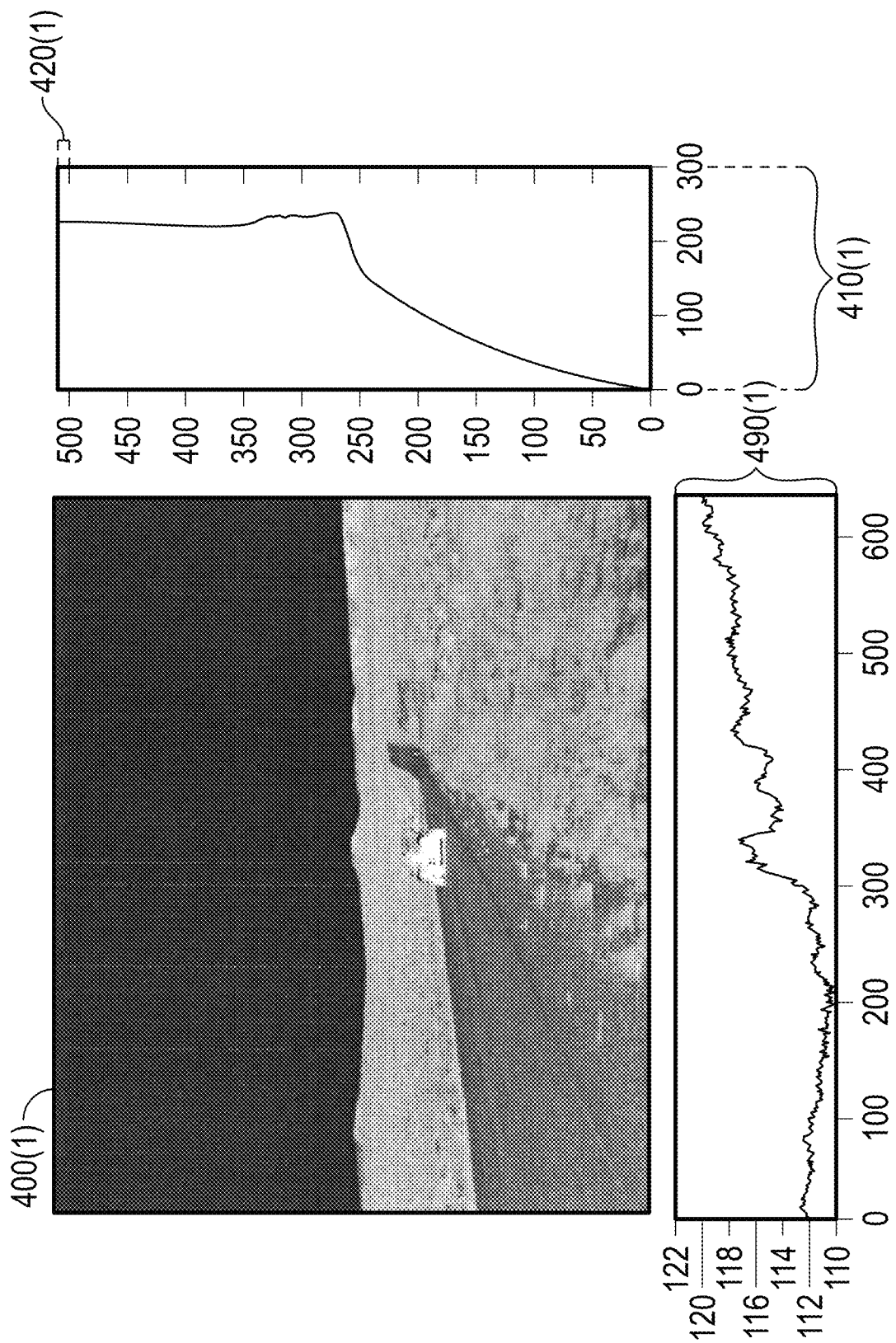
FIG. 5 illustrates a captured image frame with associated row mean values and associated column mean values in accordance with an embodiment of the disclosure.

FIG. 5 illustrates further details of image frame 400(1), its corresponding row mean values 410(1), and its corresponding column mean values 490(1) in further detail in accordance with an embodiment of the disclosure. In the example of FIG. 5, row mean values 410(1) range from approximately 0 counts to approximately 220 counts. Column mean values 490(1) range from approximately 110 counts to approximately 120 counts.

Upon inspection, it will be appreciated that row mean values 410(1) effectively provide a waveform with a changing amplitude that varies over the rows (e.g., row-to-row changes in mean pixel values are shown as a projection along the row axis of image frame 400(1)). Similarly, column mean values 490(1) effectively provide another waveform with a changing amplitude that varies over the columns (e.g., column-to-column changes in mean pixel values are shown as a projection along the column axis of image frame 400(1)). As further discussed herein, spectral transforms may be applied to the waveforms provided by row mean values 410(1)-(8) and column mean values 490(1)-(8) as part of noise reduction processing.

In block 320, processing component 110 stores the row mean values 410(1)-(8) calculated for image frames 400(1)-(8) in memory component 120 (e.g., in a first-in first-out (FIFO) queue or other appropriate data structure).

As further discussed below, in blocks 325 to 365, processing component 110 performs an iterative process in which selected subsets of the row mean values 410(1)-(8) of image frames 400(1)-(8) are processed to determine adjusted row mean values that effectively reduce spatially correlated temporal row noise from image frames 400(1) to 400(8).

In block 325, processing component 110 selects a first subset of row mean values 410(1). For example, as shown in FIG. 5, a subset 420(1) of row mean values 410(1) corresponds to the row mean values for the topmost eight rows of image frame 400(1).

In block 330, processing component 110 identifies matching subsets 420(2)-(8) in row mean values 410(2)-(8) of image frames 400(2)-(8). In this regard, processing component 110 may apply appropriate matching processes to determine subsets of row mean values 410(2)-(8) with values and/or patterns that are identical to, or substantially similar to, subset 420(1). For example, in some embodiments, matching techniques may be used as provided by U.S. Pat. No. 8,306,275 issued Nov. 6, 2012, which is incorporated herein by reference in its entirety.

In the case of a static scene 170 (e.g., no movement in scene 170 and image capture component 130 remains fixed relative to scene 170), then the matching subsets of row mean values 410(2)-(8) may correspond to the same topmost eight rows of image frames 410(2)-(8).

However, in the case of a non-static scene 170 (e.g., scene 170 exhibits movement and/or image capture component 130 is moved (e.g., translated) relative to scene 170 while image frames 400(1)-(8) are captured during block 310), the matched subsets of row mean values 410(2)-(8) may correspond to different locations among the rows of image frames 410(2)-(8) to compensate for motion in scene 170 and/or motion of image capture component 130.

Figure 6:
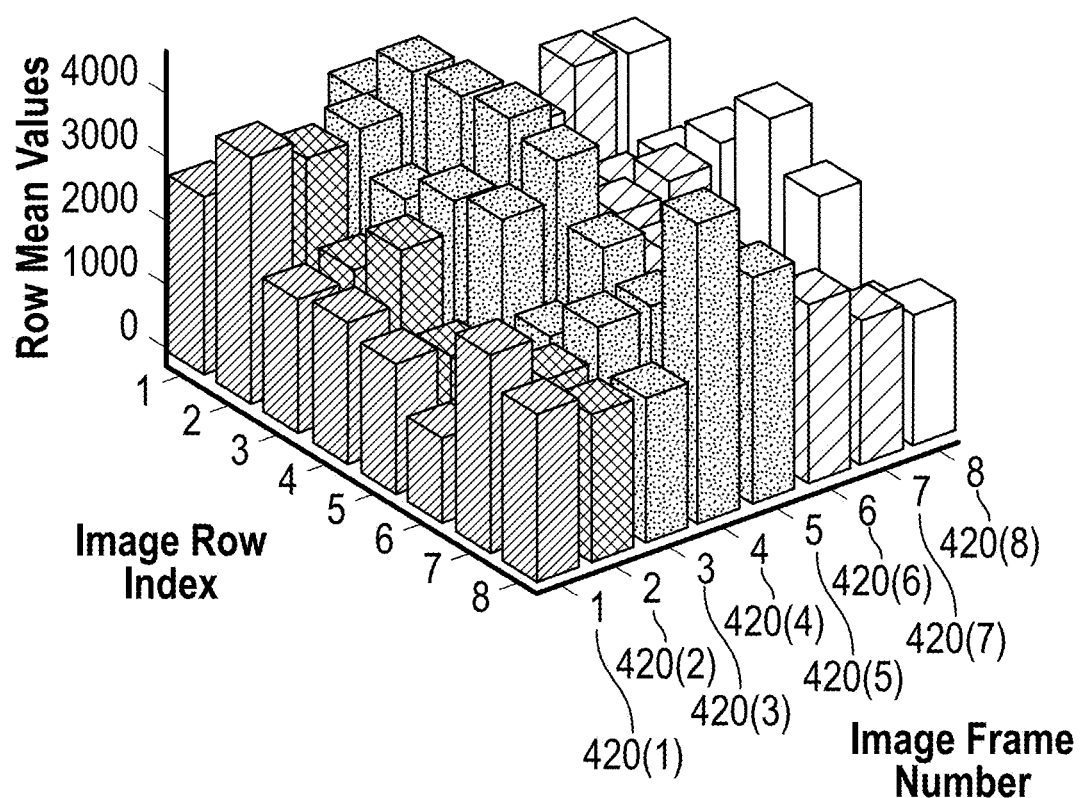
FIG. 6 illustrates row mean values in accordance with an embodiment of the disclosure.

FIG. 6 illustrates subsets 420(1)-(8) of row mean values 410(1)-(8) in accordance with an embodiment of the disclosure. As shown, each of subsets 420(1)-(8) includes eight row mean values. Thus, each individual row mean value in FIG. 6 corresponds to an individual row (denoted by row index) for a particular one of subsets 420(1)-(8). As also shown, each of subsets 420(1)-(8) effectively provides a waveform that extends in the direction of the row index. As such, spectral transforms may be applied to these waveforms.

In block 335, processing component 110 applies first spectral transforms to each of subsets 420(1)-(8) to determine a corresponding set of first spectral coefficients for each subset. In this regard, the first spectral transforms may be applied spatially to rows (e.g., row mean values). In various embodiments, different types of spectral transforms may be used including, for example, Fast Fourier Transforms (FFT), DCT, wavelet transforms, and/or others.

The first spectral transforms performed in block 335 effectively decompose the waveforms provided by the row mean values of each of subsets 420(1)-(8) shown in FIG. 6 into a set of basis function components (e.g., frequency components for appropriate spectral transforms such as FFT and DCT). The first spectral coefficients identify the contribution of the various basis function components that make up the waveforms.

Figure 7:
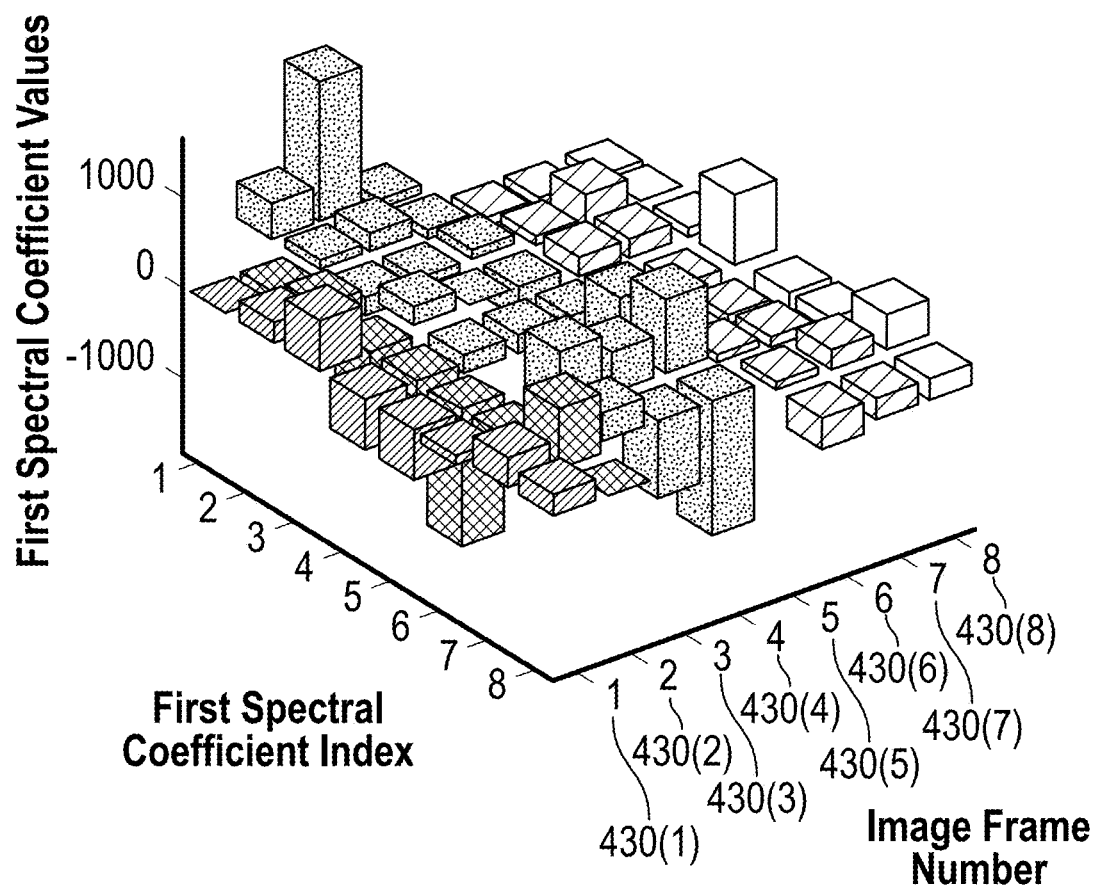
FIG. 7 illustrates first spectral coefficients following the performance of first spectral transforms accordance with an embodiment of the disclosure.

FIG. 7 illustrates eight sets of first spectral coefficients 430(1)-(8) that result from performing the first spectral transforms on subsets 420(1)-(8) (denoted by frame number in FIG. 7) in accordance with an embodiment of the disclosure. In the example shown in FIG. 7, eight basis function components are used which result in eight first spectral coefficients (denoted by coefficient index) for each set of first spectral coefficients 430(1)-430(8).

The various first spectral coefficient values correspond to the frequency contributions associated with the waveform shapes of subsets 420(1)-(8). Thus, the resulting sets 430 (1)-(8) of first spectral coefficients represent the frame-to-frame changes in various basis function components associated with subsets 420(1)-(8).

Because the same first spectral transforms are applied to all of subsets 420(1)-(8), the first spectral coefficients of sets 430(1)-(8) sharing the same coefficient index will correspond to the same frequency component. In this example, the first spectral coefficients having a coefficient index of 1 correspond to a DC component (e.g., corresponding to the mean of row sums), while the remaining first spectral coefficients having coefficient indexes of 2 through 8 correspond to the contribution of various basis function components. Although eight first spectral coefficients are determined for each of the eight subsets 420(1)-(8) (e.g., providing 64 first spectral coefficients in total), the first spectral transforms may be adjusted to provide greater or fewer numbers of first spectral coefficients as desired.

As also shown in FIG. 7, the first spectral coefficient values for a given coefficient index effectively map out another waveform for each coefficient index (e.g., each frequency component determined by the first spectral transforms) that extends in the direction of the frame number. Thus, the first spectral coefficient values effectively provide a set of eight waveforms extending in the temporal direction, with each waveform corresponding to the frame-to-frame changes in the first spectral coefficients for a given frequency component. As further discussed herein, additional spectral transforms may be applied to these waveforms provided by the first spectral coefficients.

In block 340, processing component 110 applies second spectral transforms to the first spectral coefficients. In particular, a corresponding second spectral transform may be applied to each coefficient index to determine a corresponding set of second spectral coefficients for each coefficient index. In this regard, the second spectral transforms may be applied temporally to the first spectral coefficients (e.g., applied to first spectral coefficients associated with a particular frequency component over different image frames captured at different times). The second spectral transforms may be implemented as any of the various types discussed with regard to the first spectral transforms, and different spectral transforms may be used in blocks 335 and 340 as desired.

The second spectral transforms performed in block 340 effectively decompose the waveforms provided by the first spectral coefficients for each coefficient index into another set of basis function components (e.g., frequency components for appropriate spectral transforms such as FFT and DCT). The second spectral coefficients identify the contribution of another set of basis function components that make up the first spectral coefficient index waveforms and identify the frame-to-frame changes of the first spectral coefficients.

Thus, the second spectral transforms are effectively applied to the first spectral coefficients in a temporal (e.g., time) direction (e.g., in the direction of frame numbers identified in FIG. 7 corresponding to different image frames captured over a period of time). By applying the second spectral transform to the first spectral coefficients as discussed, the second set of spectral coefficients represent the contributions of a second set of basis function components associated with frame-to-frame changes in the first spectral coefficients.

Figure 8:
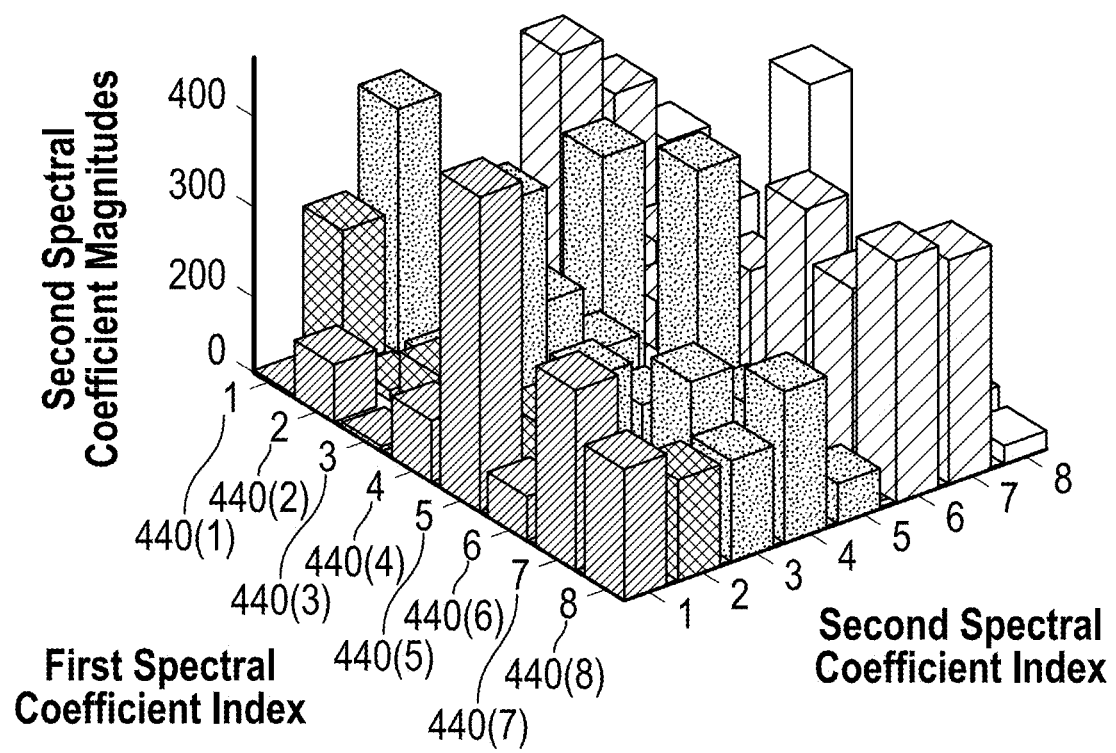
FIG. 8 illustrates second spectral coefficients following the performance of second spectral transforms in accordance with an embodiment of the disclosure.

FIG. 8 illustrates the magnitudes (e.g., absolute values) of eight sets of second spectral coefficients 440(1)-(8) which are provided by performing the second spectral transforms on corresponding sets of first spectral coefficients 430(1)-(8) in accordance with an embodiment of the disclosure. In the example shown in FIG. 8, eight basis function components are used which result in eight second spectral coefficients (denoted by second coefficient index) for each set of second spectral coefficients 440(1)-(8). Although eight second spectral coefficients are determined for each set of first spectral coefficients 430(1)-(8) (e.g., providing 64 second spectral coefficients in total), the second spectral transforms may be adjusted to provide greater or fewer numbers of second spectral coefficients as desired.

In view of the above discussion, it will be appreciated that first spectral coefficients 430(1)-(8) represent changes in the contributions of a first set of bais function components on row subsets 420(1)-(8) (e.g., how the row subsets change over a period of eight image frames as determined by the first set of basis function components). It will also be appreciated that second spectral coefficients 440(1)-(8) represent changes in the contributions of a second set of basis function components on first spectral coefficients 430(1)-(8) (e.g., how the individual first basis function components measured by the first spectral coefficients are themselves changing over time).

Accordingly, second spectral coefficients 440(1)-(8) represent the frame-to-frame changes exhibited by the currently processed subsets 420(1)-(8) of row mean values 410(1)-(8) (e.g., a representation of the flickering exhibited by the currently processed subsets 420(1)-(8) over image frames 400(1)-(8)).

Thus, by comparing second spectral coefficients 440(1)-(8) (calculated from image frames 400(1)-(8) captured of scene 170) with noise spectral coefficients (calculated from another set of image frames that contain only temporal noise and no scene information), processing component 110 can determine portions of the second spectral coefficients 440(1)-(8) that are associated with noise, and portions that are associated with valid scene information.

In block 345, processing component 110 compares second spectral coefficients 440(1)-(8) with noise coefficients. In this regard, blocks 310 to 340 may be performed on another set of image frames captured by image capture component 130 while facing a known flat field target (e.g., a known black body source in the case of thermal image frames). As such, noise coefficients may be determined for the known flat field image frames in the manner discussed herein with regard to second spectral coefficients 440(1)-(8) for scene-based image frames 400(1)-(8). Because there is no actual scene information present in the flat field image frames, the noise coefficients will be associated with pure noise (e.g., spatially correlated temporal row and column noise exhibited by system 100). As such, the noise coefficients will identify the frame-to-frame changes in basis function components associated with pure noise (e.g., no scene information). As a result, the noise coefficients may be used as threshold values to identify noise contributions in second spectral coefficients 440(1)-(8). In some embodiments, the noise coefficients may be calculated by averaging and/or weighting many thousands of individual noise coefficient estimates based on numerous flat field images of pure noise with no actual scene information.

Figure 9:
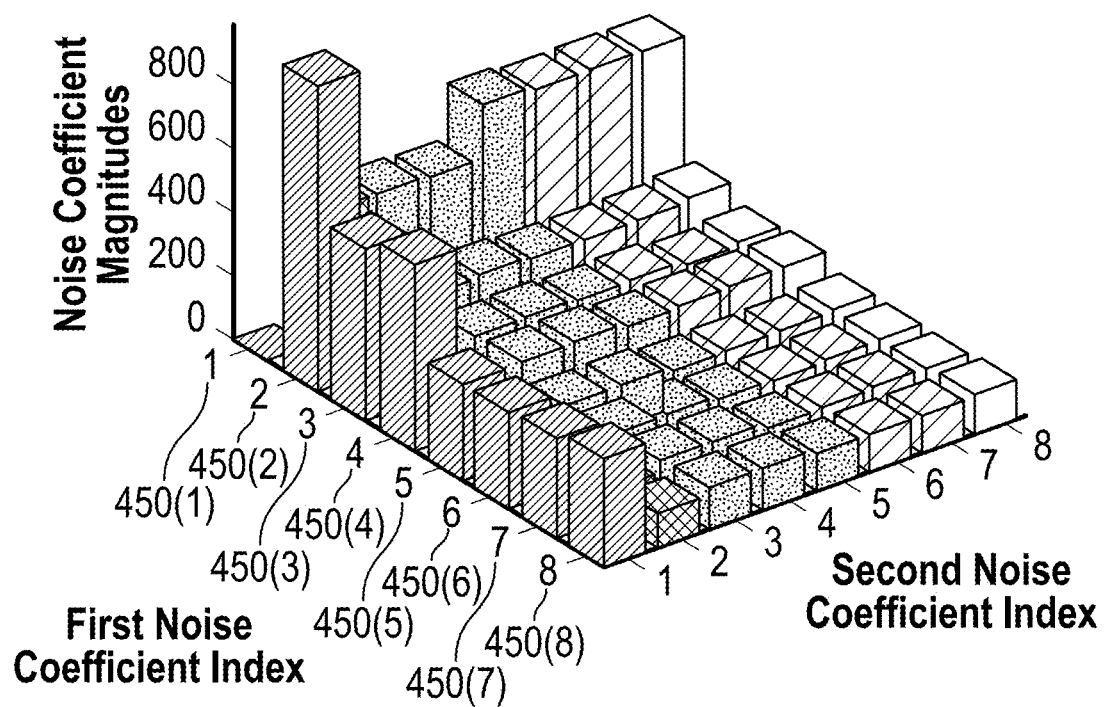
FIG. 9 illustrates noise coefficients in accordance with an embodiment of the disclosure.

FIG. 9 illustrates the magnitudes (e.g., absolute values) of eight sets of noise coefficients 450(1)-(8) determined by performing the operations of blocks 310 to 340 on a set of flat field images in accordance with an embodiment of the disclosure. Similar to second spectral coefficients 440(1)-(8), eight basis function components are used which result in eight noise coefficients (denoted by second coefficient index) for each set of noise coefficients 450(1)-(8). Again, although 64 total noise coefficients are provided, the spectral transforms may be adjusted to provide greater or fewer numbers of noise coefficients as desired.

In block 345, magnitudes of second spectral coefficients 440(1)-(8) are compared with magnitudes of noise coefficients 450(1)-(8). For example, in cases where particular ones of the second spectral coefficients 440(1)-(8) have magnitudes greater than those of corresponding noise coefficients 450(1)-(8), it can be interpreted that the second spectral coefficients 440(1)-(8) are associated with real scene changes (e.g., frame-to-frame changes in the frequency contributions of first spectral coefficients 430(1)-(8) represented by second spectral coefficients 440(1)-(8) are due to actual changes in the imaged scene—not noise).

However, in other cases where particular ones of the second spectral coefficients 440(1)-(8) have magnitudes approximately equal to or less than those of corresponding noise coefficients 450(1)-(8), it can be interpreted that the second spectral coefficients 440(1)-(8) are associated with noise (e.g., frame-to-frame changes in the frequency contributions of the first spectral coefficients 430(1)-(8) represented by the second spectral coefficients 440(1)-(8) are due to changes that occur near or below the noise floor). In such cases, the corresponding ones of the second spectral coefficients 440(1)-(8) may be adjusted (e.g., reduced in magnitude) to effectively reduce the temporal noise in image frames 400(1)-(8).

Figure 10:
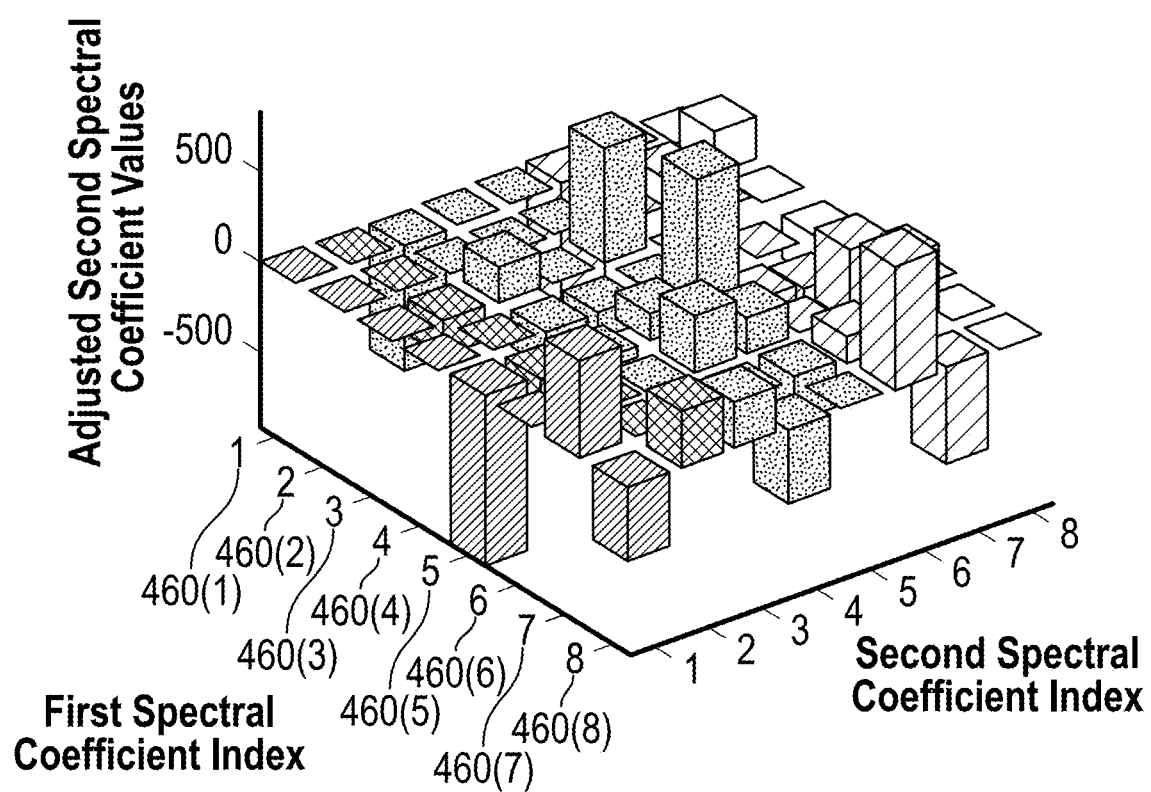
FIG. 10 illustrates adjusted second spectral coefficients in accordance with an embodiment of the disclosure.

In block 350, processing component 110 selectively adjusts one or more of the second spectral coefficients 440(1)-(8) based on the comparison performed in block 345. FIG. 10 illustrates adjusted second spectral coefficients 460(1)-(8) following the adjustment performed in block 350 in accordance with an embodiment of the disclosure. In this example, the original second spectral coefficients 440(1)-(8) with magnitudes that exceed those of noise coefficients 450(1)-(8) have not been changed, while those with magnitudes at or below have been reduced (e.g., set to zero and/or reduced by the corresponding magnitude of the noise). As a result, the adjusted second spectral coefficients 460(1)-(8) will have effectively filtered out temporal noise present in image frames 400(1)-(8).

For example, in some embodiments, temporal row and/or column noise may be represented by a small number of basis function components (e.g., one or two) that are typically at higher frequencies than scene-based basis function components. In this regard, scene-based changes typically occur at lower spatial frequencies (e.g., changing more than one row or column at a time) and lower temporal frequencies (e.g., lasting for several image frames) than temporal noise-based basis function components. By attenuating only spectral coefficients associated with the noise-based basis function components, temporal noise may be targeted and reduced without inadvertently affecting real scene data associated with other basis function components (e.g., scene-based basis function components may exhibit coefficients with magnitudes greater than the noise coefficients and therefore will not be inadvertently reduced by the techniques discussed herein).

In block 355, processing component 110 performs reverse second spectral transforms on the adjusted second spectral coefficients 460(1)-(8) to provide adjusted first spectral coefficients.

In block 360, processing component 110 performs reverse first spectral transforms on the adjusted first spectral coefficients to provide adjusted row mean values 480(1)-(8) for subsets 420(1)-(8).

Figure 11:
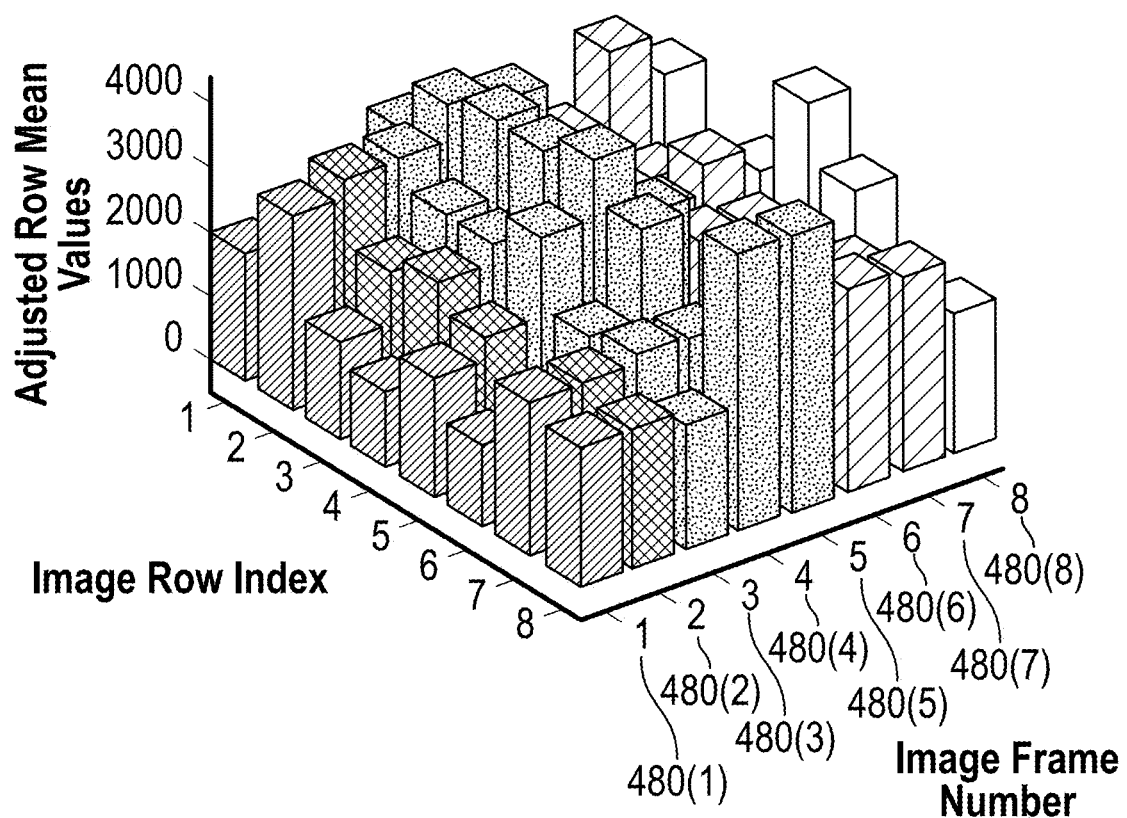
FIG. 11 illustrates adjusted row mean values in accordance with an embodiment of the disclosure.

FIG. 11 illustrates adjusted row mean values 480(1)-(8) for subsets 420(1)-(8) in accordance with an embodiment of the disclosure. By comparing the original row mean values 410(1)-(8) of FIG. 6 with the adjusted row mean values 480(1)-(8) of FIG. 11, it will be appreciated that selected ones of the row mean values have been decreased to effectively remove temporal noise. Thus, following block 360, adjusted row mean values 480(1)-(8) will have been determined for subsets 420(1)-(8) of image frames 400(1)-(8).

As discussed, blocks 325 to 360 have been performed in relation to selected subsets 420(1)-(8) to determine adjusted row mean values 480(1)-(8) of image frames 400(1)-(8). Blocks 325 to 360 may be repeated for additional subsets until adjusted row mean values have been determined for all rows of images 400(1)-(8). Therefore, if additional subsets (e.g., additional rows to be processed) remain, then the process of FIG. 3 returns to block 325 where another subset is selected. Otherwise, the process continues to block 370.

Regarding the selection of another subset in block 325, this may be performed in various ways. In some embodiments, subset 420(1) of image frame 400(1) may be advanced by one row to select a new overlapping subset. For example, if the original subset 420(1) selected in the first iteration of block 325 corresponds to rows 1 to 8 of image frame 400(1), then the second iteration may correspond to rows 2 to 9, thus resulting in an overlap of rows 2 to 8 between the first and second iterations. Additional iterations may be performed until all rows have been considered. Other overlap amounts or no overlap may be used in other embodiments.

It will be appreciated that the overlapping rows in successive subsets permits multiple adjusted row mean values to be determined for each row (e.g., seven values for each row using the one row advancement approach discussed above for subsets of eight rows—excluding the topmost and bottommost rows). As a result, in block 370, processing component 110 determines a further adjusted row mean value for each row. In various embodiments, the further adjusted row mean values may be determined by averaging, weighting, and/or otherwise combining the various adjusted row mean values determined from overlapping subsets. For example, in some embodiments, adjusted row mean values may be more heavily weighted when they are associated with rows that were at or near the middle of a subset.

Thus, following block 370, adjusted row mean values 480(1)-(8) may be determined for corresponding image frames 400(1)-(8). The adjusted row mean values 480(1)-(8) correspond to row mean values that would be exhibited by image frames 400(1)-(8) with temporal noise removed. As discussed, the adjusted row mean values determined by the process of FIG. 3 also account for real scene changes such that actual scene information that is above the temporal noise floor is effectively retained and is not filtered out.

In block 375, processing component 110 compares original row mean values 410(1)-(8) with adjusted row mean values 480(1)-(8). Based on this comparison, a row correction term (e.g., row noise correction term) is determined for each row of each of image frames 400(1)-(8). For example, in some embodiments, a row correction term for a given row of a given image frame may be determined by the difference between the original row mean value associated with the row and the adjusted row mean value associated with the row.

In block 380, blocks 315 to 375 are performed for columns of image frames 400(1)-(8). In this regard, first and second spectral transforms may be applied to subsets of column mean values 490(1)-(8) to determine appropriate spectral coefficients that are compared to corresponding noise coefficients to determine adjusted column mean values. The adjusted column mean values are used to determine column correction terms (e.g., column noise correction terms) for each column of each of image frames 400(1)-(8). As such, it will be appreciated that block 380 may encompass the various operations of blocks 315 to 375, but applied to columns. Thus, following block 380, row and column correction terms will be determined for each row and column of each of image frames 400(1)-(8).

In block 385, processing component 100 applies the row and column correction terms to image frames 400(1)-(8) to provide corresponding corrected (e.g., processed) image frames with reduced temporal noise.

In block 390, further processing may be performed and/or the corrected image frames may be displayed to a user (e.g., on display component 140) as desired. For example, in some embodiments, temporal smoothing may be performed by averaging and/or otherwise weighting adjusted row and column mean values determined for multiple image frames.

Following block 390, the process of FIG. 3 may repeat as additional image frames are captured and processed. In some embodiments, a new set of image frames may be captured and processed together in the manner discussed above with regard to FIG. 3. In some embodiments, the process of FIG. 3 is repeated with overlapping image frames such that one or more of the previously processed image frames may be included in a new set of image frames (e.g., a sliding set of image frames may be used with a new image frame added and the oldest image frame dropped in each iteration of FIG. 3).

Other variations are also contemplated. For example, although the first and second spectral transforms of blocks 335 and 340 have been described as spatial and temporal transforms, respectively, this can be reversed if desired. In this regard, the first spectral transforms can be applied in a temporal direction to provide first spectral coefficients associated with frame-to-frame variations in row or column mean values. Similarly, the second spectral transforms can be applied in a spatial direction to provide second spectral coefficients associated with the row-to-row (or column-to-column) changes in the first spectral coefficients.

Additional noise reduction techniques are provided that may be performed by appropriate components of system 100 (e.g., processing component 110, image capture component 130, and/or any of the various components of system 100) in addition to, or in place of the various noise reduction techniques previously discussed herein.

For example, in another noise reduction technique, a captured image frame may be partitioned into a plurality of sections (e.g., partitions). For each partition, column mean values (e.g., column-wise averages) are determined. A subset of the column mean values is selected. A spectral transform (e.g., DCT, wavelet transform, Fast Fourier Transform (FFT), and/or others) is applied to the selected subset of column mean values to determine spectral coefficients. The spectral coefficients are selectively adjusted to remove scene information contributions (e.g., by reducing to a lower value or zero one or more of the coefficients associated with low frequency content that typically corresponds to scene information from the captured image frame). Accordingly, the adjusted spectral coefficients will be primarily associated with noise information from the captured image frame. A reverse spectral transform is performed on the adjusted spectral coefficients to provide adjusted column mean values for the selected subset. Additional subsets of the column mean values are selected (e.g., by a sliding window) and processed to provide adjusted column mean values for each subset.

As a result, adjusted column mean values may be determined for each partition of the captured image frame. Because scene information is reduced through the reduction of spectral coefficients, the adjusted column mean values correspond primarily to the average noise present in the associated columns of the partition. As a result, the adjusted column mean values may be used to selectively update column correction terms that are applied to the captured image frame to reduce noise.

In order to reduce the possibility of unintended column inversion (e.g., through the application of a column correction term that is too large), the adjusted column mean values determined for the different partitions may be compared with each other (e.g., through standard deviation calculations and/or other calculations). If the adjusted column mean values associated with a particular column of the captured image frame are sufficiently similar to each other (e.g., having a standard deviation less than a threshold parameter), then an average of the adjusted column mean values may be used to determine an updated column correction term that is applied to the captured image frame. However, if the adjusted column mean values associated with a particular column of the captured image frame diverge significantly (e.g., having a standard deviation greater than the threshold parameter), then a previously determined column correction term may be applied instead. Although the following discussion refers to columns, it will be understood that the terms rows and columns are used interchangeably and that the principles discussed herein may be applied to rows and/or columns as appropriate.

Figure 12:
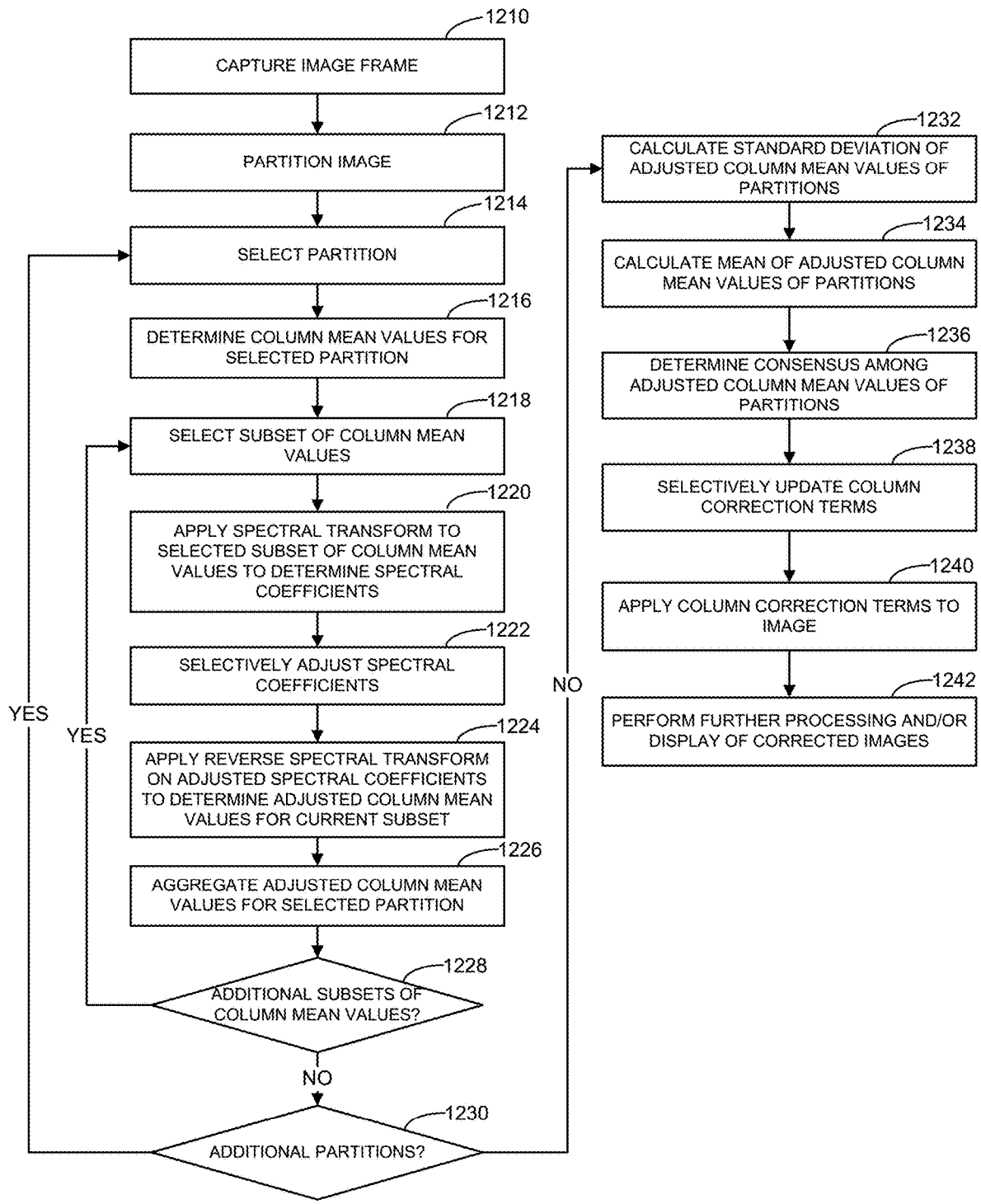
FIG. 12 illustrates a process of reducing noise in accordance with an embodiment of the disclosure.

FIG. 12 illustrates a process of reducing noise that may be performed by system 100 in accordance with an embodiment of the disclosure. In block 1210, image capture component 130 captures an image frame of scene 170 that is provided to processing component 110 through interface component 136 and connection 137.

Figure 13:
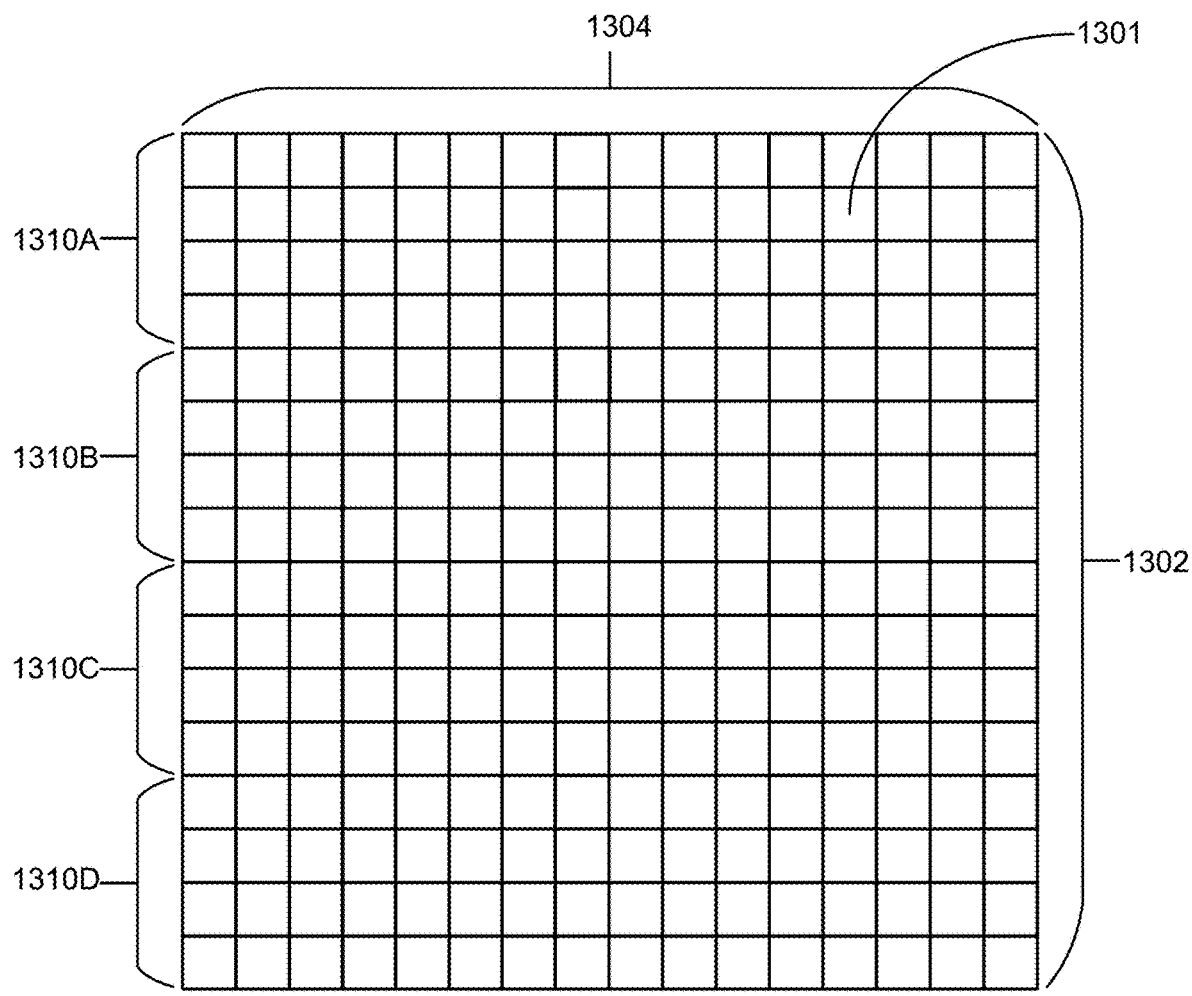
FIG. 13 illustrates a captured image frame with several partitions in accordance with an embodiment of the disclosure.

In block 1212, processing component 110 partitions the captured image frame into one or more sections (e.g., partitions). For example, FIG. 13 illustrates a captured image frame 1300 comprising a plurality of pixels 1301 (e.g., each having an associated pixel value) arranged in a plurality of rows 1302 and columns 1304. As also shown in FIG. 13, image frame 1300 includes four partitions 1310 A-D, each corresponding a subset of the rows 1302 that include all columns 1304.

Although image frame 1300 is illustrated with 16 rows and 16 columns, any desired number of rows and columns may be used, and the number of rows and columns may be different from each other. Similarly, although image frame 1300 is illustrated with 4 partitions each including 4 rows and 16 columns, any desired number of partitions and partition sizes may be used.

In block 1214, processing component 110 selects a first one of partitions 1310 A-D. For purposes of example only, partition 1310 A may be initially selected in block 1214.

Figure 14:
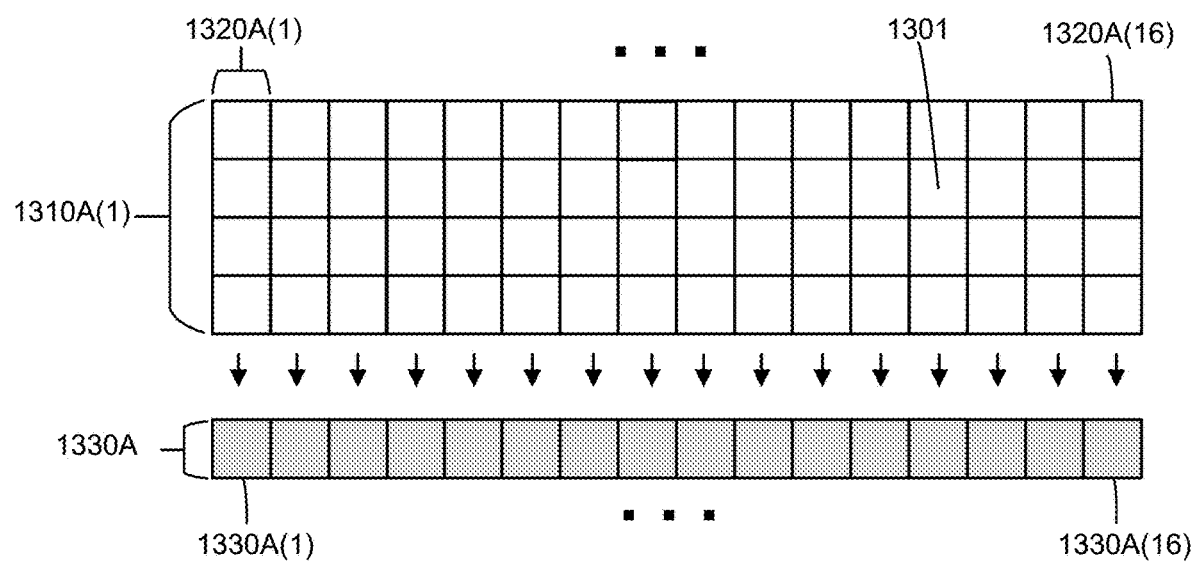
FIG. 14 illustrates a determination of column mean values in accordance with an embodiment of the disclosure.

In block 1216, processing component 110 determines column mean values for the selected partition 1310 A. For example, FIG. 14 illustrates selected partition 1310 A in accordance with an embodiment of the disclosure. As shown, partition 1310 A includes a plurality of columns individually identified as 1320A(1) to 1320A(16) which may be used to calculate a set of corresponding column mean values 1330 A individually identified as 1330A(1) to 1330A(16) (e.g., a one dimensional array such as a 1 by 16 vector in this example). For example, in some embodiments, the pixel values of all pixels of each individual column 1320A(1) to 1320A(16) may be averaged to provide corresponding column mean values 1330A(1) to 1330A(16).

Figure 15:
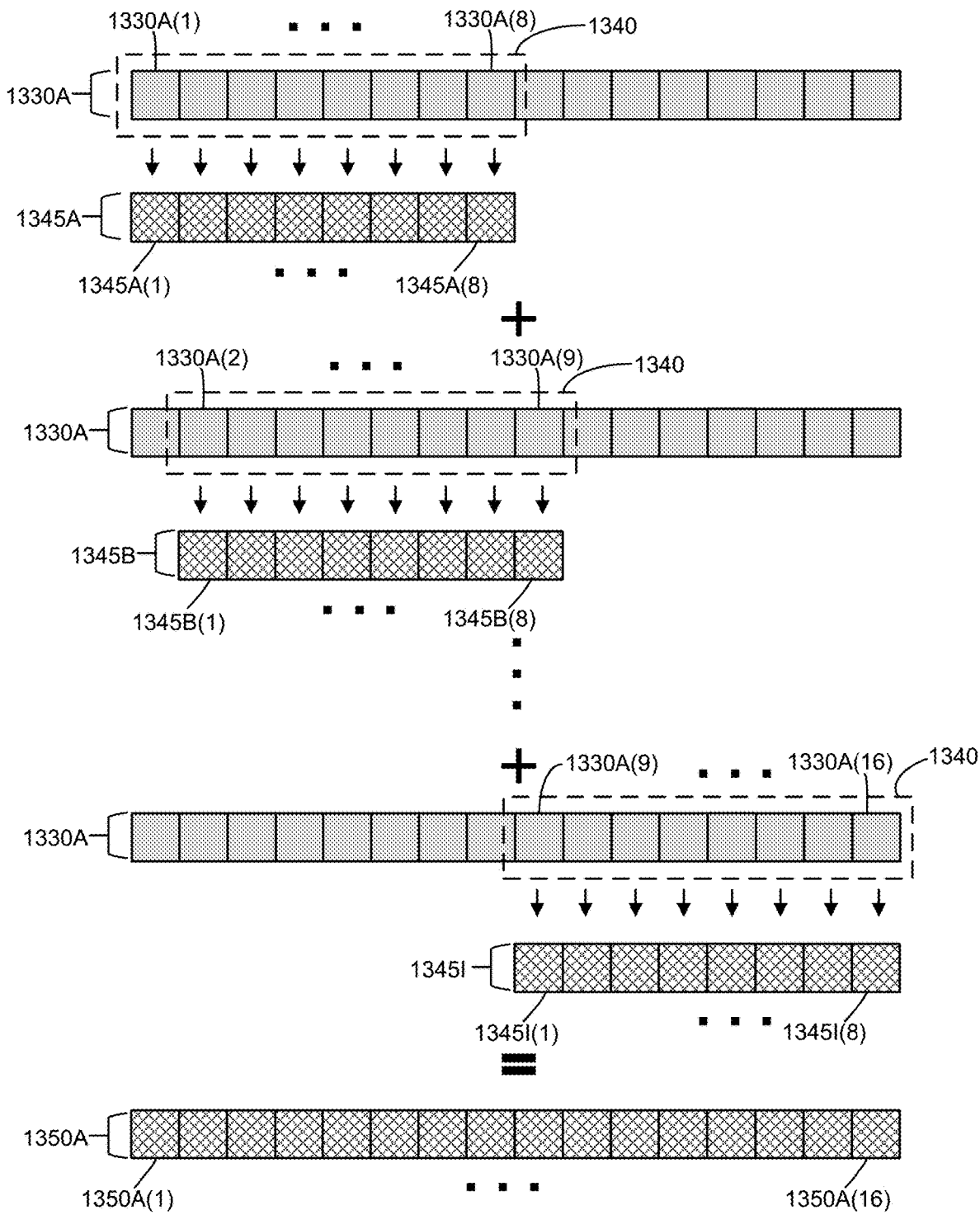
FIG. 15 illustrates a determination of adjusted column mean values in accordance with an embodiment of the disclosure.

In block 1218, processing component 110 selects a subset (e.g., a kernel) of the column mean values 1330 A. For example, FIG. 15 illustrates column mean values 1330 A with column mean values 1330A(1) to 1330A(8) initially selected as a subset. In this regard, the subset of selected column mean values 1330A(1) to 1330A(8) may be selected, for example, by shifting a sliding window 1340 across column mean values 1330 A.

In block 1220, processing component 110 applies a spectral transform to the selected subset of column mean values 1330A(1) to 1330A(8). For example, as similarly discussed previously herein with regard to row mean values 410(1)-(8) and subsets 420(1)-(8) of FIGS. 4-6, the selected subset of column mean values 1330A(1) to 1330A(8) effectively provide a waveform (e.g., the individual column mean values 1330A(1) to 1330A(8) change from column to column). Accordingly, in block 1220, processing component 110 applies a spectral transform to column mean values 1330A(1) to 1330A(8) to determine a corresponding set of spectral coefficients. For example, the spectral transform may be applied spatially to column mean values 1330A(1) to 1330A(8). As discussed, in various embodiments, different types of spectral transforms may be used including, for example, Fast Fourier Transforms (FFT), DCT, discrete wavelet transforms, and/or others.

The spectral transform performed in block 1220 effectively decomposes the waveform provided by the subset of column mean values 1330A(1) to 1330A(8) into a set of basis function components (e.g., frequency components for appropriate spectral transforms such as FFT and DCT). The spectral coefficients identify the contribution of the various basis function components that make up the waveform.

In block 1222, processing component 110 selectively adjusts one or more of the spectral coefficients determined in block 1220. In this regard, in some embodiments, one or more of the spectral coefficients associated with low frequency content (e.g., a set of spectral coefficients including one or more associated with the basis function components having the lowest frequencies among the spectral coefficients) are reduced (e.g., to a lower value and/or to zero). As discussed, the low frequency spectral coefficients may be associated with scene information from captured image frame 1300, while higher frequency spectral coefficients may be associated with noise.

In general, scene information may not exhibit significant changes in pixel values among pixels associated with the selected subset kernel range. As a result, scene information is generally associated with low frequency spectral coefficients. In contrast, noise may exhibit significant changes in pixel values among pixels associated with the selected subset kernel range and is therefore generally associated with high frequency spectral coefficients. Thus, by reducing the low frequency spectral coefficients, the scene information associated with the selected subset of column mean values 1330A(1) to 1330A(8) may be reduced. The remaining higher frequency spectral coefficients may be associated with noise in the selected subset of column mean values 1330A(1) to 1330A(8).

Thus, in block 1222, processing component 110 provides a set of adjusted spectral coefficients that include individual spectral coefficients that have been reduced (e.g., associated with scene information) and also include individual spectral coefficients that have not been changed (e.g., associated with noise information).

In block 1224, processing component 110 performs a reverse spectral transform on the adjusted spectral coefficients to provide adjusted column mean values 1345A, wherein individual adjusted column mean values 1345A(1) to 1345A(8) are associated with original column mean values 1330A(1) to 1330A(8), respectively.

In block 1226, the adjusted column mean values 1335 A may be aggregated (e.g., added) together with other adjusted column mean values 1335B to 1335I (e.g., determined in further iterations of blocks 1218 to 1224 performed on additional subsets of column mean values 1330 A selected by sliding window 1340 as further discussed herein) to provide a set of combined adjusted column mean values 1350A for partition 1310A.

Blocks 1218 to 1226 have been initially discussed as being performed in relation to a subset of column mean values 1330A(1) to 1330A(8) selected by sliding window 1340 to provide adjusted column mean values 1345A(1) to 1335A(8). Blocks 1218 to 1226 may be repeated for additional selected subsets of column mean values 1330 A to provide additional adjusted column mean values. Accordingly, if additional subsets of column mean values 1330A remain to be processed (block 1228), then the process returns to block 1218 where a new subset of column mean values 1330A are selected. For example, as shown in FIG. 15, sliding window 1340 may be shifted in a pixel-wise manner to the right to select a new subset of column mean values 1330A(2) to 1330A(9). In this regard, blocks 1218 to 1226 may be repeated for column mean values 1330A(2) to 1330A(9) to provide adjusted column mean values 1345B including individual adjusted column mean values 1345B(1) to 1345B(8) associated with original column mean values 1330A(2) to 1330A(9), respectively.

The process of FIG. 12 may repeat blocks 1218 to 1226 until sliding window 1340 has selected all available subsets (e.g., until sliding window 1340 has moved to the far right of column mean values 1330 A to include column mean value 1330A(16) as shown in FIG. 15. In this example, these iterations of blocks 1218 to 1226 may determine nine sets of adjusted column mean values associated with the original column mean values as set forth in the following Table 1:

TABLE 1

| Original column mean values | Adjusted column mean values |
| --- | --- |
| 1330A(1) to 1330A(8) | 1345A(1) to 1345A(8) |
| 1330A(2) to 1330A(9) | 1345B(1) to 1345B(8) |
| 1330A(3) to 1330A(10) | 1345C(1) to 1345C(8) |
| 1330A(4) to 1330A(11) | 1345D(1) to 1345D(8) |
| 1330A(5) to 1330A(12) | 1345E(1) to 1345E(8) |
| 1330A(6) to 1330A(13) | 1345F(1) to 1345F(8) |
| 1330A(7) to 1330A(14) | 1345G(1) to 1345G(8) |
| 1330A(8) to 1330A(15) | 1345H(1) to 1345H(8) |
| 1330A(9) to 1330A(16) | 1345I(1) to 1345I(8) |

As also discussed, the adjusted column mean values 1345A to 1345I may be aggregated together to provide combined adjusted column mean values 1350A for partition 1310A. It will be appreciated that as sliding window 1340 moves to the right, individual column mean values 1330A (2) to 1330A(15) will be processed in more than one iteration of blocks 1218 to 1228. As a result, the adjusted column mean values 1350 A may include multiple contributions from individual column mean values 1330A (e.g., column mean value 1330A(8) will be processed eight times and therefore contribute to adjusted column mean values 1345 A to 1345G, all of which are included in adjusted column mean values 1350 A). Accordingly, in various embodiments, adjusted column mean values 1350A may be further modified (e.g., divided by the number of overlapping contributions) as appropriate.

Figure 16:
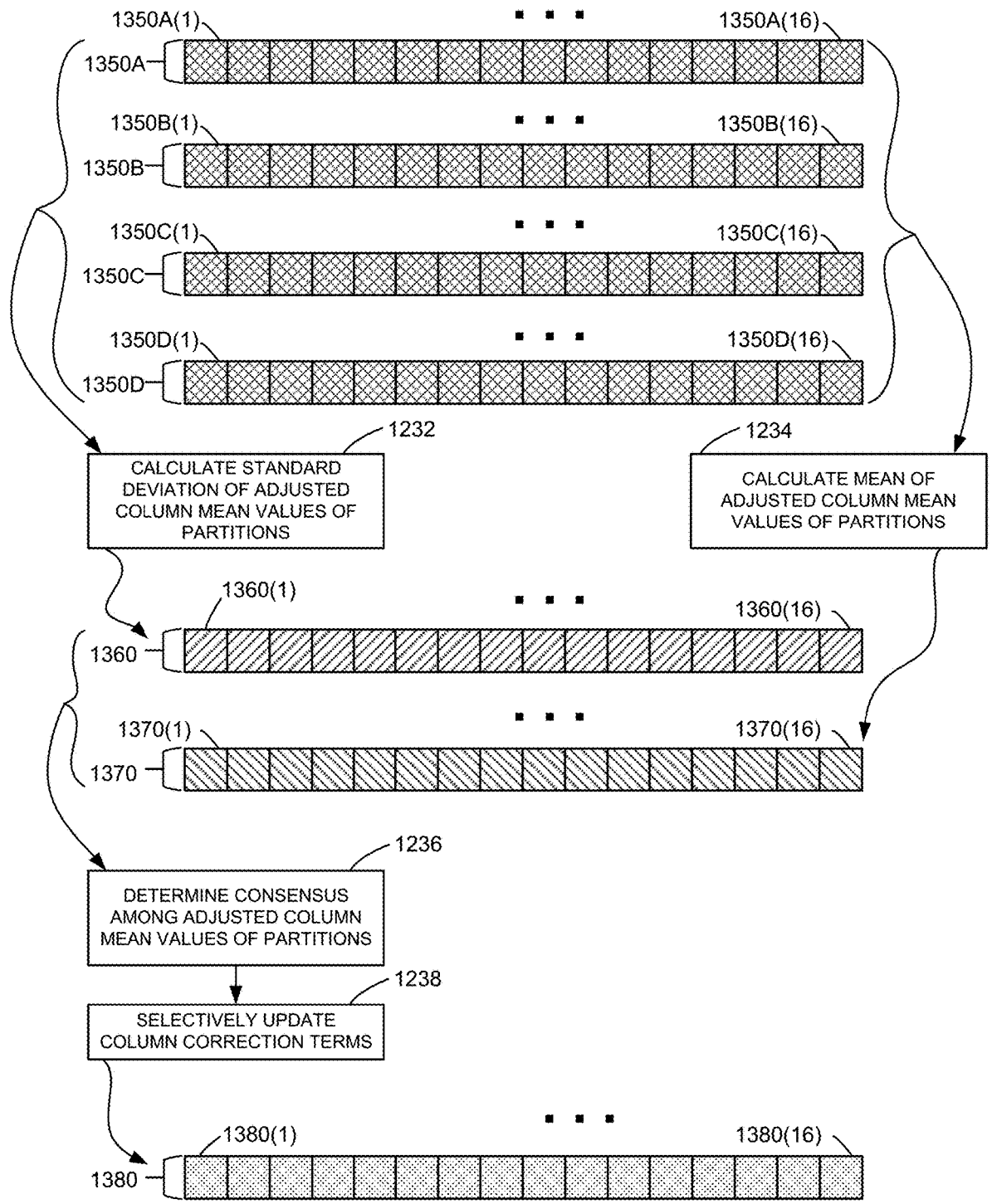
FIG. 16 illustrates a determination of updated column correction terms in accordance with an embodiment of the disclosure.

After all subsets of adjusted column mean values 1330A have been processed to determine the resulting adjusted column mean values 1350A for partition 1310A (block 1228), processing component 110 determines whether any additional partitions remain to be processed (block 1230). In this regard, the process of FIG. 12 continues to repeat blocks 1214 through 1230 until sets of column mean values 1330B, 1330C, and 1330D and sets of adjusted column mean values 1350B, 1350C, and 1350D have been determined for the remaining partitions 1310B, 1310C, and 1310D, respectively. Thus, following the last iteration of block 1230, adjusted column mean values 1350A,1350B, 1350C, and 1350D will have been determined for all of partitions 1310A, 1310B, 1310C, and 1310D as identified in FIG. 16 in accordance with an embodiment of the disclosure.

In blocks 1232 to 1236, processing component 110 determines one or more comparison metrics used for corresponding adjusted column mean values 1350A, 1350B, 1350C, and 1350D. For example, in block 1232, processing component 110 calculates standard deviations 1360 of corresponding adjusted column mean values 1350A, 1350B, 1350C, and 1350D. For example, standard deviation 1360(1) is calculated from corresponding adjusted column mean values 1350A(1), 1350B(1), 1350C(1), and 1350D(1), and additional standard deviations 1360(2) to 1360(16) may be calculated for the remaining columns.

In block 1234, processing component 110 calculates mean values 1370 (e.g., averages) of corresponding adjusted column mean values 1350A, 1350B, 1350C, and 1350D. For example, mean 1370(1) is calculated from corresponding adjusted column mean values 1350A(1), 1350B(1), 1350C(1), and 1350D(1), and additional means 1370(2) to 1370(16) may be calculated for the remaining columns.

In block 1236, processing component 110 determines a consensus among corresponding adjusted column mean values 1350A, 1350B, 1350C, and 1350D. In this regard, processing component 110 may perform a comparison to determine whether the values of corresponding adjusted column mean values 1350A, 1350B, 1350C, and 1350D for each column are sufficiently similar to each other in order to reduce the possibility of unintended column inversion as discussed.

For example, for the leftmost column, a consensus may be calculated in block 1236 by comparing the standard deviation 1360(1) with a threshold value. If the standard deviation 1360(1) for the column is less than the threshold value, this indicates that the adjusted column mean values 1350A(1), 1350B(1), 1350C(1), and 1350D(1) are close in value to each other.

As discussed, the adjusted column mean values 1350A(1), 1350B(1), 1350C(1), and 1350D(1) are generally associated with noise in image frame 1310 due to the removal of scene information through the previous adjustment of spectral coefficients in block 1220. Accordingly, a consensus among the adjusted column mean values 1350A(1), 1350B(1), 1350C(1), and 1350D(1) (e.g., corresponding to standard deviation 1360(1) being less than the threshold value) indicates that similar noise is associated with the leftmost column in each of partitions 1310A, 1310B, 1310C, and 1310D. As a result, in block 1238, an updated correction term 1380(1) may be generated for the leftmost column corresponding to mean 1370(1). In this regard, the generated correction term 1380(1) represents an average noise value associated with the leftmost column which may be applied to the associated column of image frame 1300 to reduce column noise.

Referring again to block 1236, if the standard deviation 1360(1) is greater than the threshold value, this indicates that the adjusted column mean values 1350A(1), 1350B(1), 1350C(1), and 1350D(1) are not sufficiently close in value to each other. In this regard, a significant deviation among these values indicates that noise has not been consistently identified for the leftmost column among the different partitions 1310A, 1310B, 1310C, and 1310D. In this case, in block 1238, correction term 1380(1) is not updated and a previously determined correction term value may be used instead for correction term 1380(1) (e.g., a factory correction term or a correction term determined in a previous iteration of the process of FIG. 12). Blocks 1236 and 1238 may be performed for all columns of image frame 130 to selectively update column correction terms 1380(1) to 1380(16) associated with individual columns of image frame 1300.

In block 1240, processing component 110 applies the column correction terms 1380(1) to 1380(16) to corresponding columns of image frame 1300. For example, in some embodiments, column correction terms 1380 may be offsets that are subtracted from the pixel values of image frame 1300.

In block 1242, further processing may be performed and/or the corrected image frame may be displayed to a user (e.g., on display component 140) as desired. Following block 1242, the process of FIG. 12 may repeat as additional image frames are captured and processed.

Other variations are also contemplated. For example, in some embodiments, the process of FIG. 12 may be performed for rows in addition to and/or instead of columns. In some embodiments, row skipping may be performed. In this regard, rather than determining column mean values 1330A, 1330B, 1330C, and 1330D using all rows in their associated partitions 1310A, 1310B, 1310C, and 1310D, respectively, one or more rows may be skipped.

In some embodiments, instead of a standard deviation, one or more other comparison metrics may be used. For example, a sum may be determined and compared to a threshold to determine a consensus in block 1236. For example, a sum of the absolute values of the differences between adjusted column mean values 1350A to 1350D and mean values 1370 may be determined for each column as follows: sum =abs(adjusted column mean value 1350A–mean value 1370)+abs(adjusted column mean value 1350B–mean value 1370)+abs(adjusted column mean value 1350C–mean value 1370)+abs(adjusted column mean value 1350D–mean value 1370).

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
   determining a plurality of column mean values for an image frame comprising scene information and noise information;
   selecting a plurality of partitions of the image frame, wherein each partition comprises a plurality of pixels of the image frame;
   processing each of the partitions by:
      performing a spectral transform on at least a subset of the column mean values to determine spectral coefficients,
      adjusting the spectral coefficients to reduce the scene information, and
      performing a reverse spectral transform on the adjusted spectral coefficients to determine adjusted column mean values; and
   selectively updating column correction terms for the image frame to reduce the noise information using the adjusted column mean values separately determined for each of the partitions.

2. The method of claim 1, further comprising:
   for each column of the image frame, determining a standard deviation for the adjusted column mean values of the partitions;
   comparing the standard deviations to a threshold; and
   wherein the updating comprises updating the column correction terms associated with the standard deviations less than the threshold.

3. The method of claim 2, wherein each of the updated column correction terms comprises an average of the adjusted column mean values of the partitions associated with the column of the image frame.

4. The method of claim 1, wherein the adjusting comprises reducing at least one of the spectral coefficients.

5. The method of claim 4, wherein the one of the spectral coefficients is associated with a basis function component having a lowest frequency among the spectral coefficients.

6. The method of claim 1, wherein the column mean values comprise a one dimensional array.

7. The method of claim 6, further comprising performing the spectral transform, the adjusting, and the reverse spectral transform to determine adjusted column mean values for a plurality of overlapping subsets of the column mean values of the one dimensional array.

8. The method of claim 1, wherein the spectral transform is a discrete cosine transform or a discrete wavelet transform.

9. The method of claim 1, further comprising applying the correction terms to the image frame to reduce the noise information.

10. A system comprising:
    a memory component storing machine-executable instructions; and
    a processor configured to execute the instructions to cause the system to:
       determine a plurality of column mean values for an image frame comprising scene information and noise information,
       select a plurality of partitions of the image frame, wherein each of the partitions comprises a plurality of pixels of the image frame;
       process each of the partitions to:
          perform a spectral transform on at least a subset of the column mean values to determine spectral coefficients,
          perform an adjustment of the spectral coefficients to reduce the scene information and,
          perform a reverse spectral transform on the adjusted spectral coefficients to determine adjusted column mean values, and
       selectively update column correction terms for the image frame to reduce the noise information using the adjusted column mean values separately determined for each of the partitions.

11. The system of claim 10, wherein the processor is configured to execute the instructions to cause the system to:
    for each column of the image frame, determine a standard deviation for the adjusted column mean values of the partitions;
    compare the standard deviations to a threshold; and
    wherein the updates comprise updates of the column correction terms associated with the standard deviations less than the threshold.

12. The system of claim 11, wherein each of the updated column correction terms comprises an average of the adjusted column mean values of the partitions associated with the column of the image frame.

13. The system of claim 10, wherein the adjustment of the spectral coefficients comprises a reduction of at least one of the spectral coefficients.

14. The system of claim 13, wherein the one of the spectral coefficients is associated with a basis function component having a lowest frequency among the spectral coefficients.

15. The system of claim 10, wherein the column mean values comprise a one dimensional array.

16. The system of claim 15, wherein the processor is configured to execute the instructions to cause the system to perform the spectral transform, the adjustment, and the reverse spectral transform to determine adjusted column mean values for a plurality of overlapping subsets of the column mean values of the one dimensional array.

17. The system of claim 10, wherein the spectral transform is a discrete cosine transform or a discrete wavelet transform.

18. The system of claim 10, wherein the processor is configured to execute the instructions to cause the system to apply the correction terms to the image frame to reduce the noise information.

* * * * *

UNITED STATES PATENT AND TRADEMARK OFFICE
CERTIFICATE OF CORRECTION

PATENT NO. : 11,227,365 B2
APPLICATION NO. : 16/689897
DATED : January 18, 2022
INVENTOR(S) : Lin et al.

It is certified that error appears in the above-identified patent and that said Letters Patent is hereby corrected as shown below:

In the Specification

Column 1, Line 7/8, change "patent application Ser. No." to --Patent Application No.--.

Column 1, Line 12, change "patent application Ser. No." to --Patent Application No.--.

Column 1, Line 25, change "patent application Ser. No." to --Patent Application No.--.

Column 14, Line 9, change "bais" to --basis--.

Signed and Sealed this
Tenth Day of May, 2022

*Katherine Kelly Vidal*

Katherine Kelly Vidal
*Director of the United States Patent and Trademark Office*